(12) United States Patent
Dorr et al.

(10) Patent No.: US 9,483,057 B2
(45) Date of Patent: Nov. 1, 2016

(54) FUNCTION-MONITORED GUIDANCE SYSTEM FOR ADJUSTING AT LEAST ONE SYSTEM COMPONENT AND METHOD FOR MONITORING THE FUNCTION OF SUCH A GUIDANCE SYSTEM

(71) Applicant: Airbus Operations GmbH, Hamburg (DE)

(72) Inventors: Björn Dorr, Stuhr (DE); Tobias Ulmer, Bremen (DE); Philip Neuhaus, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/912,773

(22) Filed: Jun. 7, 2013

(65) Prior Publication Data

US 2013/0345908 A1     Dec. 26, 2013

Related U.S. Application Data

(63) Continuation of application No. PCT/EP2012/000161, filed on Jan. 16, 2012.

(60) Provisional application No. 61/432,891, filed on Jan. 14, 2011.

(30) Foreign Application Priority Data

Jan. 14, 2011   (DE) .................. 10 2011 008 561

(51) Int. Cl.
  *G05D 1/00*   (2006.01)
  *G05D 1/04*   (2006.01)
  (Continued)

(52) U.S. Cl.
  CPC .............. *G05D 1/042* (2013.01); *G05B 15/02* (2013.01); *G05B 23/0235* (2013.01); *G05D 1/00* (2013.01)

(58) Field of Classification Search
  None
  See application file for complete search history.

(56) References Cited

U.S. PATENT DOCUMENTS 4,366,544 A     12/1982  Shima et al.
4,566,101 A  *  1/1986  Skonieczny et al. ......... 714/706
(Continued)

FOREIGN PATENT DOCUMENTS

DE         19860333       6/2000
DE    60 2004 008 718     6/2008
(Continued)

OTHER PUBLICATIONS

International Search Report and Written Opinion for Application No. PCT/EP2012/000161 dated Apr. 24, 2012.
(Continued)

*Primary Examiner* — John R Olszewski
*Assistant Examiner* — James M McPherson
(74) *Attorney, Agent, or Firm* — Jenkins, Wilson, Taylor & Hunt, P.A.

(57) ABSTRACT

A function-monitored guidance system for adjusting at least one system component, the guidance system including a guiding mechanism having at least one adjustment component for guiding adjustment movements of the system component to be adjusted, of which at least one adjustment component includes a sensor device for detecting a load state of the adjustment component, and a monitoring device connected functionally to the adjustment component. The monitoring device provides detection time periods for detecting sensor signals of the at least sensor device, provides a threshold value, with which the number of overshoots thereof by the sensor signals within detection time periods is determined, and determines, from the number of overshoots in each case within the detection time periods, a value for the operating state. A method for monitoring the function of a guidance system for adjusting at least one system component is also disclosed.

24 Claims, 10 Drawing Sheets

(51) Int. Cl.
*G05B 23/02* (2006.01)
*G05B 15/02* (2006.01)

(56) References Cited

U.S. PATENT DOCUMENTS

| | | | | |
|---|---|---|---|---|
| 5,587,931 | A * | 12/1996 | Jones et al. | 702/34 |
| 7,360,996 | B2 * | 4/2008 | Driver | 416/226 |
| 7,567,862 | B2 * | 7/2009 | Pelton et al. | 701/33.8 |
| 7,600,718 | B2 * | 10/2009 | Perez-Sanchez | 244/215 |
| 8,021,112 | B2 * | 9/2011 | Dinjus et al. | 416/1 |
| 8,036,783 | B2 * | 10/2011 | Pohl | 701/4 |
| 8,123,478 | B2 * | 2/2012 | Ahmann | 416/1 |
| 2007/0124038 | A1 * | 5/2007 | Goupil | 701/29 |
| 2009/0169378 | A1 * | 7/2009 | Menke | 416/1 |
| 2009/0326890 | A1 | 12/2009 | Shetty et al. | |
| 2011/0305568 | A1 * | 12/2011 | Brath et al. | 416/1 |

FOREIGN PATENT DOCUMENTS

| | | |
|---|---|---|
| DE | 10 2008 052 754 | 5/2010 |
| DE | 10 2011 008 561 | 7/2012 |
| GB | 2135782 | 9/1984 |
| WO | WO 97/05982 | 2/1997 |
| WO | WO 2012/095325 | 7/2012 |

OTHER PUBLICATIONS

International Preliminary Report on Patentability for Application No. PCT/EP2012/000161 dated Jul. 16, 2013.

* cited by examiner

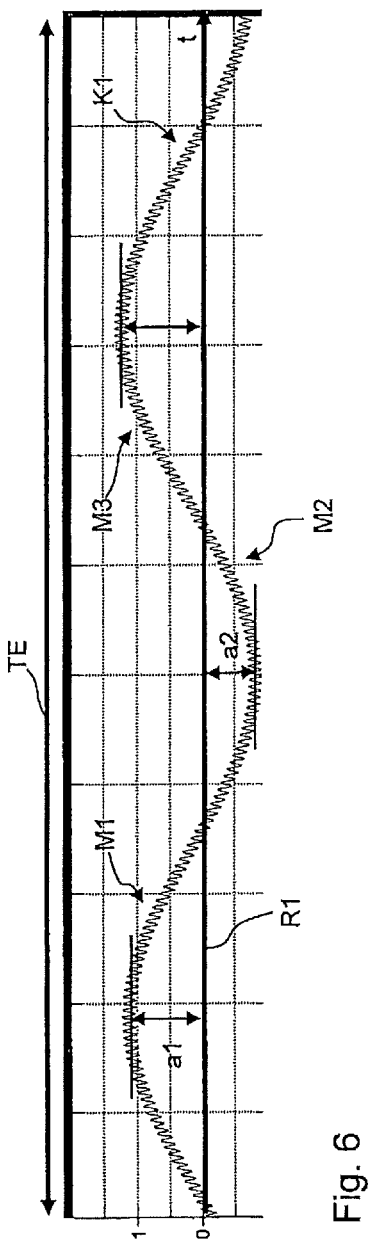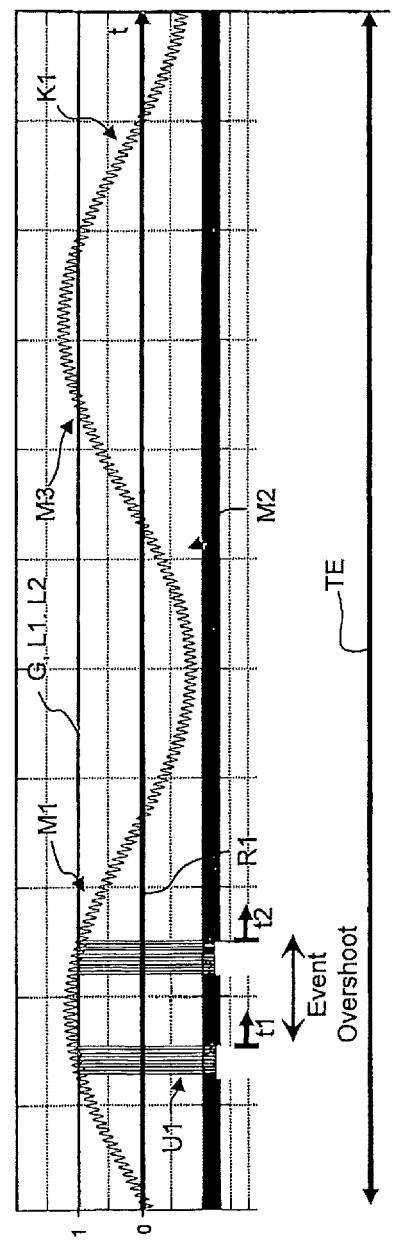

FUNCTION-MONITORED GUIDANCE SYSTEM FOR ADJUSTING AT LEAST ONE SYSTEM COMPONENT AND METHOD FOR MONITORING THE FUNCTION OF SUCH A GUIDANCE SYSTEM

CROSS-REFERENCE TO RELATED APPLICATIONS

This application is a continuation of and claims priority to PCT application No. PCT/EP2012/000161 filed Jan. 16, 2012, which claims the benefit of the filing date of German Patent Application No. DE 10 2011 008 561.0 filed Jan. 14, 2011 and of U.S. Provisional Patent Application No. U.S. 61/432,891 filed Jan. 14, 2011, the disclosures of which applications are hereby incorporated herein by reference.

TECHNICAL FIELD

The invention relates to a function-monitored guidance system for adjusting at least one system component and a method for monitoring the function of a guidance system for adjusting at least one adjustment component.

Methods for diagnosing and predicting a state of health and therefore a level of wear of mechanical systems are known, in particular for aircraft.

BACKGROUND

US 2009/0326890 A1 describes a system, a computer program product and a method for predicting events and a deterioration of a mechanical system, in particular for use in an aircraft.

DE 198 60 333 A1 describes a method for the model-based oscillation-diagnostic monitoring of rotating machines, in particular hydraulically operated electric machines.

U.S. Pat. No. 4,366,544 A1 describes a detection system which detects an abnormal state of a bearing by means of a microphone as a sensor, in which waveform signals are captured as vibrations generated by a rotary machine. Components which rotate slowly and which are actuated in the short term at specific intervals under high mechanical load are monitored.

SUMMARY

The object of the invention is to provide a function-monitored guidance system for adjusting at least one system component and a method for monitoring the function of such a guidance system for adjusting at least one adjustment component, with which the state of a mechanical adjustment component can be monitored automatically in an improved manner.

This object is achieved by the features of the independent claims. Further embodiments are disclosed in the dependent claims, which refer back to these independent claims.

The invention relates to the determination of a level of wear of a mechanical, in particular kinematic control or system component using at least one sensor device which is connected to a monitoring device formed as a processing unit, in particular as a detection and evaluation device. With the solution according to the invention, the load on the mechanical device during an operating phase is captured by the sensor device and measured by the monitoring device, evaluated and recorded. The monitoring device according to the invention is formed as a computer program product.

Owing to the at least one adjustment component provided in accordance with the invention and a sensor device for measuring a state of load of the adjustment components as well as a monitoring device connected functionally to the adjustment component and having an operating state determination function implemented therein for determining the operating state of the adjustment component, the invention also relates in particular to a measuring system for carrying out the method according to the invention and to the use of the computer program product and measuring system on an application system, in particular a wind turbine, a vehicle system and in particular a high-lift system for an aircraft.

According to one aspect of the invention, a function-monitored guidance system for adjusting at least one system component is provided. The guidance system in particular comprises:

a guiding mechanism having at least one adjustment component for guiding adjustment movements of the system component to be adjusted, of which at least one adjustment component comprises a sensor device for detecting a load state of oscillation properties, occurring over a period of time, of the adjusting system kinematics of the adjustment component, and a monitoring device connected functionally to the sensor device and having an operating state determination function or integrity determination function implemented therein for determining an operating state or the integrity respectively of the adjustment component.

In accordance with the invention the function for determining functional integrity is designed or formed in such a way that the integrity determination function provides at least one predefined or determined detection time period for detecting sensor signals of the at least sensor device, provides at least one predefined or determined limiting value or threshold value based on the amplitudes or the sensor signals, determines the number of overshoots of at least one threshold value by the captured sensor signal and/or the number of undershoots of at least one further threshold value by the captured sensor signal, in each case within the at least one detection time period, and from this determines a value for the operating state or the functional integrity of the adjustment component or for the operating state or functional integrity of the operating system.

The detection time period may in particular be provided as a predefined period of time during operation of the adjustment component which in turn elapses at intervals and in particular predefined intervals or after a functional event during operation of the guidance system according to the invention so that the number of overshoots of a threshold value within a respective detection time period is determined. The functional event during operation of the guidance system according to the invention may in particular be a predefined actuation of the adjustment component.

The function-monitored guidance system according to the invention may in particular be a vehicle system, for example an adjustment system, or power or torque transfer system of a vehicle, in particular of a land vehicle, a watercraft or an aircraft. The power or torque transfer system may be the drive system of such a vehicle which comprises the driveshaft and the gear unit for setting the output power. Furthermore, the power or torque transfer system may be a motor system comprising a motor shaft and a control shaft such as a camshaft and corresponding bearing devices of the shafts.

The function-monitored guidance system may furthermore also be an adjustment system of an aircraft, in particular for actuating adjustable flaps. In this case the adjustment components may in particular be a gear unit, a rotary actuator, a bearing device of a adjustment system of an aircraft and in particular a high-lift system of an aircraft.

In accordance with further embodiments of the invention, the guidance system according to the invention may be a adjustment system or a drive system or a bearing system of a wind turbine.

In particular, the adjustment component may be: the rotor shaft, which is coupled to the rotor to which the vanes are attached, a generator device, a gear unit, which in particular can be coupled between the generator and the rotor shaft, at least one further transmission shaft, which couples the input of the generator to the rotor shaft, or bearing devices for mounting the rotor shaft or a transmission shaft, or an actuator, for example for adjusting the vanes.

Generally, the adjustment component according to the invention may thus be one of the shafts mentioned, a bearing device in particular for mounting said shaft on a structural component, or an actuator or a gear unit.

The detection time period may be a period of time within an operating phase of the adjustment component or a predefined operating phase or the entire period of use of the adjustment component. Furthermore, the detection time period may be activated in particular by a specific command of a control device of the monitoring device by initiating an operating mode of the adjustment component or of the guidance system or on the basis of automatic settings, for example of the temporal kind.

A detection period of the function-monitored guidance system may in particular be generated based on a command initiated by the function-monitored guidance system itself, in particular such as a self-test command to initiate a self-test. With the self-test command, a command to set a predefined operating state for the function-monitored guidance system can be generated and transmitted to corresponding adjustment systems thereof to set this operating state. When designing the function-monitored guidance system for example as a vehicle system or adjustment system of a wind turbine, the control command for setting an operating state may in particular be the setting of an operating state with relatively low loading of the guidance system and in particular a largely idling state. In a wind turbine this is the state in which the vanes are not engaged or are only slightly engaged (for example up to 15%) so that only relatively low air loading is applied and therefore the guidance system in this embodiment sends a control command to the adjustment component to adjust the vanes in such a way that they are set to the aforementioned level of low engagement.

In the embodiment of the function-monitored guidance system as an adjustment system and in particular a high-lift system of an aircraft, the method according to the invention and the activation of a detection period or the setting of a test or of an operation to determine the operating state of the adjustment component may be implemented on the ground as a test for flight preparation within the scope of a flight preparation program. The function-monitored guidance system may have a self-test function for this purpose, which actuates the adjustment component in a predefined manner during the operating phase in which the aircraft is on the ground, and in particular moves the adjustment component between the retracted and extended state and optionally back into the starting, retracted state. In this instance the detection time period may in particular be the first half of the aforementioned actuation process or the entire aforementioned actuation process or part thereof.

In the embodiment of the function-monitored guidance system as a adjustment system and in particular a high-lift system of an aircraft, the activation and implementation of the determination of the value for the operating state of the adjustment component or of the operating system during an operating phase of the aircraft may be provided before take-off during the extension of flaps and in particular of high-lift flaps into the take-off position, or in the approach phase of the landing phase during extension of high-lift flaps from the cruising position thereof into a landing position thereof.

In this context, "operating state" of the adjustment component or of the operating system is understood to mean the current condition and qualitative functional capability of the adjustment component. This may be defined in particular by the requirement of a maintenance measure, such as the replacement of the component, that is to say a maintenance state, or a repair of a component, that is to say of a maintenance state of the adjustment component or of the operating system. The requirement of a maintenance measure may be defined in various stages according to its criticalness. For example, it may mean:
  a first stage, in which no maintenance measure has to be carried out at a respective current moment in time,
  a second stage, in which a maintenance measure is to be carried out, but does not have to be carried out at a predefined moment in time and therefore does not have to be planned, and
  a third stage, in which a maintenance measure has to be carried out at a predefined moment in time and therefore has to be planned and optionally recorded.

Intermediate stages may also be provided and defined between the aforementioned three stages.

"Operating phase of the adjustment component" is understood in this context to mean a predefined movement thereof from a first position into a second position.

"Operating phase of the operating system" is understood in particular in this context to mean a predefined functional phase thereof, in particular a flight phase such as ground operation, take-off phase, ascent after take-off, cruising flight, approach phase of the landing phase or final landing phase of the landing phase in the embodiment of the function-monitored guidance system as a adjustment system of an aircraft, and in particular as a high-lift system.

"Functional integrity is understood herein to mean the functional capability of the adjustment component and in particular the assessment of the error state of the adjustment component. "Assessment of the error state of the adjustment component" means the assessment, in accordance with which an error state is allocated to the adjustment component, that is to say whether an error state is allocated, and if so, which error state.

According to the invention a monitoring device connected functionally to the adjustment component and having an operating state determination function or an integrity determination function implemented therein is used to determine the operating state or integrity respectively of the adjustment component. The monitoring device is in particular formed by a computer program product which can be loaded with program commands in a program store from a processing unit formed as a microcomputer so as to carry out all the steps of the above-described method if the computer program product is implemented in the processing unit. The computer program product has the advantage that it does not require any additional computer in a machine, but can be implemented in a computer already provided in a machine or aircraft. The computer program product may be provided for example in the processing unit as a physical medium in the form of a readable and writable semiconductor store. The computer program product has the advantage that it can be easily adapted in order to improve the diagnosis and evaluation method.

An advantage of the invention is to provide a method and a monitoring system so that a mechanical device can be serviced in the future less so in a time-based manner and more so in a state-dependent manner. This affords the advantage that expensive downtimes of the mechanical device can be better estimated and therefore better planned, which saves resources and leads directly or indirectly to greater satisfaction among users of the mechanical device. In addition, resources are preserved, since the device only has to be serviced or replaced according to wear and not according to time.

According to the invention the effect is utilised in that the mechanical device oscillates during operation thereof and these oscillations are correlated directly to a level of wear, that is to say a state of heath, of the mechanical device. The number of oscillations and the amplitude of the oscillations increase if the level of wear of the mechanical device has increased. According to the invention, oscillations of the mechanical device are captured during operation thereof using a sensor device, and from this a conclusion is drawn regarding the level of wear of the mechanical device by comparison with setpoint values. This affords the advantage that maintenance of the mechanical device, which in turn may be incorporated in a device or system or machine, no longer has to be carried out at regular intervals over time, but is carried out automatically merely according to condition. A further advantage is that the condition can be examined easily and quickly, for example by remote inquiry, or could also be examined in the background by a processing unit.

According to one embodiment of the function-monitored guidance system according to the invention, it is designed in such a way that the operating state determination function records the number of overshoots of a positive amount of a threshold value, in each case for the absolute amount of the signal value, and determines, from the number of overshoots thus determined of a threshold value, in each case for the absolute amount of the signal value, the number of threshold value overshoots. Similarly, the number of overshoots may also be determined with negative amounts if the at least one threshold value is also determined negatively.

According to a further embodiment of the function-monitored guidance system according to the invention, this is designed in such a way that the operating state determination function for processing sensor signals captured in relation to a adjustment component is designed in such a way that it allocates to the adjustment component, in the event of an overshoot of a first minimum number of overshoots of the predefined threshold value by the sensor signal or respectively the absolute value of the sensor signal within the detection period, an operating state value and in particular a maintenance state, and, in the event of a second minimum number of overshoots of the predefined threshold value by the sensor signal or respectively the absolute value of the sensor signal within the detection period, a further operating state value and in particular a further maintenance state.

According to an embodiment of the function-monitored guidance system according to the invention, it is designed in such a way that the operating state determination function is designed to process sensor signals captured in relation to a adjustment component in such a way that it allocates an operating state value and in particular a maintenance state to the adjustment component if a first minimum number of overshoots of a first predefined threshold value is exceeded within the detection period, and/or allocates an operating state value and in particular a further maintenance state if a second minimum number of overshoots of the threshold value and/or of a further predefined threshold value is exceeded.

According to an embodiment of the function-monitored guidance system according to the invention, this is designed in such a way that the operating state determination function for detecting an overshoot or undershoot of at least one threshold value by the captured sensor signal provides at least a pair of threshold values, of which a first threshold value is defined as a triggering threshold value, and a second threshold value is defined as an ending threshold value, and the operating state determination function is designed in such a way that, in order to determine the number of threshold value overshoots by the respective captured sensor signal, a threshold value overshoot is considered to be provided under the condition that the operating state determination function determines an overshoot of a triggering threshold value and a subsequent fall of the sensor signal below the ending threshold value, and/or that, in order to determine the number of threshold undershoots by the respective captured sensor signal, a threshold value undershoot is considered to be provided under the condition that the operating state determination function determines an undershoot of a triggering threshold value and a subsequent overshoot of the ending threshold value.

According to an embodiment of the invention, the triggering threshold value and the ending threshold value are of equal size in terms of value and are therefore identical.

Furthermore, the operating state determination function is designed in such a way that it determines the overshoot of the triggering threshold value and/or undershoot respectively of the triggering threshold value by means of a triggering minimum period. This is the case in particular if the value of this triggering threshold value for detecting the signal fall, as a further triggering threshold value, is different from said further triggering threshold value and lies below the value of the first triggering threshold value. In this case, with regard to the corridor between the first triggering threshold value and the further triggering threshold value, a progression of the sensor signal above and/or below this corridor respectively is captured as an overshoot of the triggering threshold value or undershoot of the further triggering threshold value or of the corridor by means of the triggering minimum period.

Furthermore, the operating state determination function may be designed in such a way that it determines a fall in the captured sensor signal below the ending threshold value or an overshoot of a further ending threshold value by the captured sensor signal by means of an ending minimum period. This is the case in particular if the value of this ending threshold value is different, in terms of the detection of the overshoot of a threshold value by the signal as a further triggering threshold value, from said further triggering threshold value and lies below the value of the first triggering threshold value for detecting a fall in the sensor signal. In this case, with regard to the corridor between the first triggering threshold value and the further triggering threshold value, the sensor signal thus enters this corridor from above or from below by means of the ending minimum period.

Furthermore, the operating state determination function may be designed in such a way that the overshoot minimum period and/or the undershoot minimum period are identical.

According to an embodiment of the function-monitored guidance system or of the operating state determination function according to the invention, these are designed in such a way that the detection periods are defined by at least one operating phase of the adjustment component and/or of the guidance system, wherein the detection periods in which the monitoring device detects the number of overshoots or undershoots of a predefined threshold value are provided in a predefined manner in particular within a predefined operating phase of the adjustment component or of the guidance system, or coincide temporally with the operating phase. In particular, the operating state determination function may be designed in such a way that it defines the start of the operating phase by generating a command to the respective adjustment component to introduce or carry out this operating phase or by a sensor value, which has been transmitted from a sensor for detecting the control state of the adjustment component to the operating state determination function, so that it can determine the introduction or implementation of this operating phase.

According to an embodiment of the operating state determination function according to the invention, it is in particular designed in such a way that the detection periods are defined by the actuation of the adjustment component and/or of the guidance system, wherein a detection period in which the monitoring device detects the number of overshoots of a predefined threshold value is activated upon each actuation or upon selected actuations of the adjustment component or of the guidance system.

According to an embodiment of the operating state determination function according to the invention, this is in particular designed in such a way that, upon determination of the number of overshoots or undershoots, that is to say of the fall of the sensor signal below a threshold value, in each of the detection time periods, the predefined first minimum number of overshoots used to allocate an operating state increases overall or increases continuously during the sequence of detection periods from one detection period to a respective subsequent detection time period.

The sensor device provided according to the invention may comprise a sensor which is attached to the housing of the adjustment component and in particular to the inner face or outer face of a housing part of the adjustment component.

According to a further embodiment of the invention, the sensor of the sensor device for determining a load state of the adjustment component may further be formed of one or more of the following sensors: at least one oscillation sensor for detecting structural oscillations, at least one acceleration sensor, at least one torque sensor, at least one vibration sensor, at least one strain gauge, an arrangement of strain gauges, at least one piezo vibration sensor, at least one microphone, or at least one measuring device having a contactless laser, with which vibrational movements and resultant load states of the adjustment component are determined over the respective current period between a moving part of the adjustment component and a reference point.

According to a further embodiment of the invention the operating state determination function has a start function for initiating the determination of the operating state, which provides a predefined start level and a comparison of captured sensor signal values with the start level and is designed in such a way that the onset of determination of the operating state is initiated when the start function determines that the signal values are above the start level above a predefined initiation time period.

According to a further embodiment of the invention the operating state determination function has a stop function for ending the determination of the operating state, which provides a predefined stop level lying below the start level and a comparison of captured sensor signal values with the stop level and is designed in such a way that the determination of the operating state is stopped when the stop function determines that the signal values are below the stop level over a predefined initiation time period.

Furthermore, in accordance with a further embodiment of the invention the operating state determination function formed of a plurality of detection time periods may produce a series of indices or measured values, from the time curve of the adjustment component of which a value for the operating state is derived, wherein in particular the operating state of each of the plurality of detection time periods is determined in each case by means of the start function.

Furthermore, in accordance with an embodiment of the guidance system the operating state determination function may assign a value for the operating state from the time curve of the measured values. The integrity determination function can be designed in such a way that an operating state assessment of the adjustment component is carried out if there is a deviation of the sum of overshoots and/or undershoots at a current moment in time from a number, predicted for this moment in time, of overshoots and/or undershoots over a predefined minimum period.

In order to improve the measurement result and to eliminate errors caused for example by external oscillations, in accordance with an embodiment of the guidance system and method according to the invention external oscillations are filtered out by further oscillation-compensating sensors. External oscillations may occur for example in an aircraft by oscillations of the engine and may severely alter the oscillations actually to be measured. In order to prevent this, either the engine oscillations can preferably be measured directly at the engine, or known oscillation curves can be used. The undesirable oscillations measured can then be filtered out for example by time synchronisation.

The level of wear is recorded and determined at regular intervals, in particular during each operating phase of the mechanical device in order to achieve the highest possible level of measurement accuracy.

In accordance with a particularly preferred method, in order to prevent unscheduled maintenance works caused by the occurrence of unexpected wear and errors, which may lead to a generally cost-intensive outage of the mechanical device and therefore of the machine, a function is determined from the determination of the level of wear at regular intervals or during each operating phase, and a future operating phase is calculated from the function, in which the mechanical device has a level of wear which is expected to be intolerable and will require restricted operation and/or a maintenance period. An accurate prediction of when the mechanical device has to be serviced or replaced is thus possible in accordance with the method according to the invention. This leads to a cost reduction, since the future outage of the machine is known and can be better planned. Replacement devices and machines can thus be kept ready in the long term and at the right time.

According to a method developing the invention, the level of wear is derived from a frequency analysis of oscillations, in particular wherein one or more determined threshold values are undershot or overshot within a fixed period by the captured oscillations in the form of a signal value. The introduction of a frequency analysis affords the advantage that short level overshoots, which possibly come from undesirable sources of interference or from components which do not originate from the mechanical device to be monitored, can thus be filtered out.

The method for evaluating the oscillations is further preferably designed in such a way that the undershoots and/or overshoots of the signals are counted, wherein in particular a counting pulse is started after an overshoot from a threshold value and the counting pulse is ended as soon as a stop threshold value is undershot by the signal for a previously defined stop period. This affords the advantage that the captured signal values can be better isolated and therefore, in turn, sources of interference can be better eliminated.

In order to determine a system state as easily as possible, the method is preferably defined in such a way that a system state of the mechanical device is determined by the number of counting impulses on the basis of a measuring signal, wherein in particular a measuring signal is defined from the kinetics of a mechanical device. The age or level of wear of the mechanical device is thus easily captured by an evaluation device by simply measuring the counting impulses within a specific period.

In order to carry out the method according to the invention with greater precision, a comparison is preferably made with signals of related kinetic cycles to evaluate the age of the mechanical device. This affords the advantage that basically identical, that is to say equivalent cycles are compared instead of different cycles. In a preferred application, in particular in a high-lift system of an aircraft, four different cycles are defined for example. These are an extension and retraction of landing flaps before a take-off and, again, an extension and retraction before a landing of the aircraft.

Owing to the method according to the invention, the mechanical device can now be serviced or replaced safely at a specific moment in time, preferably if a state of wear of the mechanical device is assessed by the method as being unhealthy or intolerable because a tolerance threshold has been exceeded, in particular in accordance with which the results concerning the state of the mechanical device have preferably been strung together to form a function, in particular a curve.

According to the invention a computer program product is also provided which can be loaded with program errors in a program store from a processing unit formed as a microcomputer in order to carry out all the steps of the above-described method when the computer program product is implemented in the processing unit.

The computer program product affords the advantage that no essential additional components are required in a machine in which the measurement method is carried out, but can be implemented as a module having a processing unit already provided in a machine or in particular in an aircraft. The computer program product may be provided for example in the processing unit as a physical medium in the form of a readable and writable semiconductor store. The computer program product affords the advantage that it can be easily adapted to new empirically determined values, threshold values and tolerance thresholds in order to improve the diagnosis, assessment and prediction methods.

According to a further aspect of the invention, a measuring system is also provided for determining a level of wear of a mechanical, in particular kinematic device having at least one sensor, a processing unit as a detection and evaluation device comprising an interface and a computer program product, in particular as described above, wherein the wear level determination system comprises at least one motion sensor, in particular an acceleration sensor and/or a gyro sensor and/or a vibration sensor. The measuring system affords the advantage that it can be used in different machines, on different gear units and bearings and motors, preferably in an aircraft on engines, hydraulic pumps, air conditioning systems and fans. The measuring system may be designed with any number of sensors, which each monitor a mechanical device. A plurality of, in particular different sensors may also be attached to a mechanical device in order to eliminate measurement errors.

A use according to the invention of an above-described measuring system provides a use in an aircraft, in particular on a high-lift system, wherein the measuring system is particularly preferably used during the extension and retraction of landing flaps before take-off or landing of the aircraft. In particular it is used on gear unit components, more preferably to monitor a planetary gear as a rotary actuator.

A high-lift system for an aircraft with a drive unit, a transmission shaft system, positioning sensors and mechanical overload protection devices and rotary actuators for extending and retracting landing flaps on wings comprises an above-described measuring system, wherein each rotary actuator is formed with a motion sensor as part of the measuring system. Slowly rotating rotary actuators which are actuated in the short term under high mechanical load and are usually formed as planetary gears are thus equipped with a wear level measuring system and, owing to the measuring system according to the invention, maintenance of the rotary actuators can be carried out in a timely manner using the measuring method according to the invention.

In accordance with the invention a method for monitoring the function of a guidance system for adjusting at least one adjustment component is also provided. The guidance system comprises in particular: at least one adjustment component for guiding adjusting movements of the system component to be adjusted, and a sensor device on at least one adjustment component for detecting a load state of the adjustment component. The method for monitoring function comprises the following steps in particular:

provision of at least one predefined or determined detection time period for detecting sensor signals of the at least one sensor device, provision of at least one predefined or determined threshold value based on the amplitudes of the sensor signals, determination from the number of overshoots of at least one threshold value by the captured sensor signal and/or the number of undershoots of at least one further threshold value by the captured sensor signal, in each case within the at least one detection time period, of a value for the operating state of the adjustment component or of the operating system.

It is understood that the features mentioned above and those still to be explained hereinafter can be utilised not only in the combinations stated herein, but also in other combinations.

BRIEF DESCRIPTION OF THE DRAWINGS

The invention will be described hereinafter with reference to the accompanying figures, in which:

FIG. 6 is a general schematic view of a time-oscillation diagram for a time period of a sensor signal generated by the sensor device owing to the actuation of the adjustment component;

FIG. 7 is a schematic view of a sensor signal generated by the sensor device owing to the actuation of the adjustment component in a detection time period according to the invention, in which the overshoot of a threshold value by the sensor signal occurs, wherein the threshold value is simultaneously a triggering threshold value and an ending threshold value for determining the overshoot of at least one threshold value by the sensor signal.

DETAILED DESCRIPTION

According to the invention a function-monitored guidance system is provided which comprises a system component which is adjustable or is to be adjusted by means of a adjustment component 20, 120, 300, in particular as part of a guiding mechanism. To adjust the system component the guidance system comprises at least one adjustment component 20, 120, 300 and at least one sensor device S. At least one sensor device S is arranged on at least one adjustment component 20, 120, 300, that is to say is attached to or integrated in the adjustment component 20, 120, 300.

The sensor device S is adapted for detecting a load state of the adjustment component 20, 120, 300. For this purpose, the sensor device S may in particular comprise a piezo vibration sensor and/or a microphone and/or an acceleration sensor and/or a torque sensor and/or a strain sensor. By means of the at least one sensor device S or plurality of sensor devices S, a monitoring device 400 is connected functionally to an integrity determination function implemented therein to determine the integrity of the adjustment component 20, 120, 130. The function for determining the functional integrity is designed in particular in such a way that the integrity determination function provides at least one predefined or determined detection time period for detecting sensor signals of the at least one sensor device S, provides at least one predefined or determined threshold value G based on the amplitudes of the sensor signals, determines the number of overshoots of at least one threshold value G by the captured sensor signal and/or the number of undershoots of at least a further threshold value G by the captured sensor signal, in each case within the at least one detection time period, and from this determines a value for the operating state of the adjustment component 20, 120, 300 or of the operating system.

The function-monitored guidance system thus determines oscillation properties of the adjustment component 20, 120, 300 in a detection time period and forms from this a value for the operating state or the functional integrity of the guiding mechanism or of the adjustment component.

Figure 1:
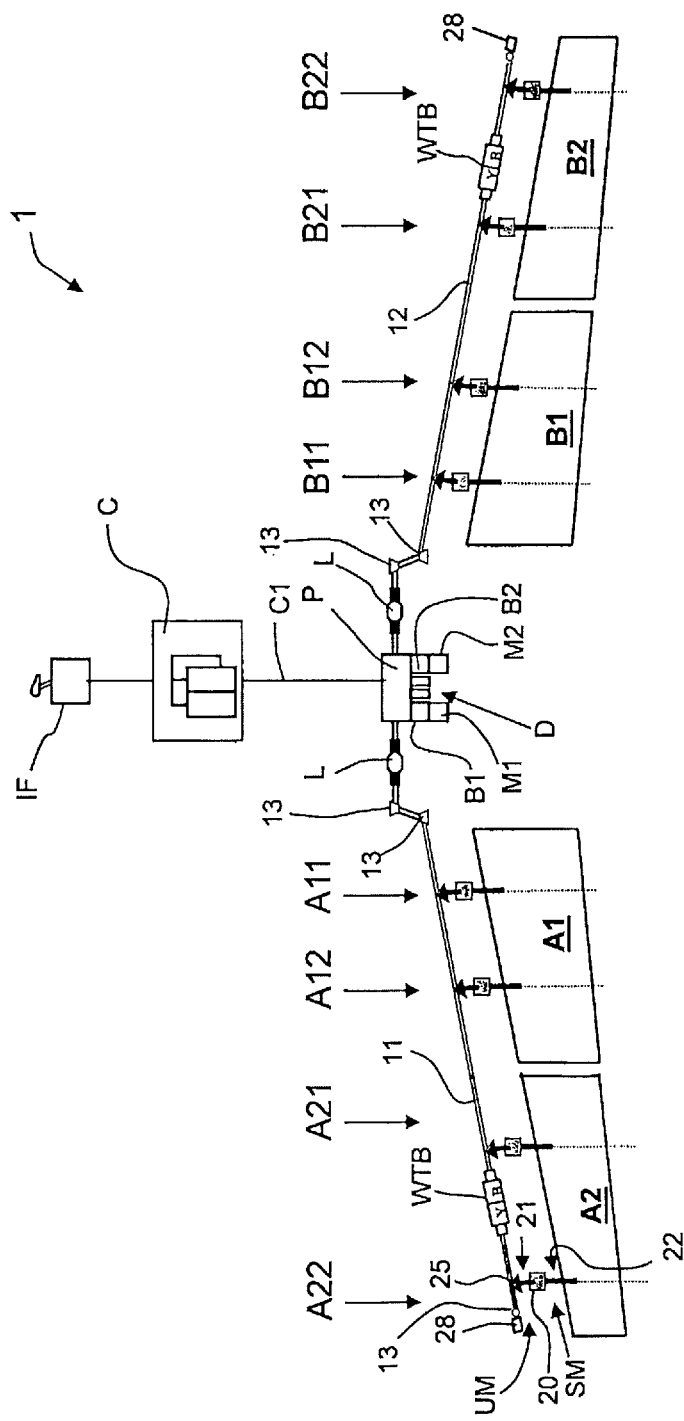
FIG. 1 is a schematic view of an embodiment of the function-monitored guidance system according to the invention in the form of a high-lift system of an aircraft comprising adjustable flaps, of which two are provided for each wing, comprising control devices for actuating the adjustable flaps, wherein the control devices each comprise at least one actuator and in each case at least a first load sensor arranged on the input side, and at least a second load sensor arranged on the output side of the at least one actuator, and wherein the control devices are driven by a central drive motor and a rotary shaft coupled thereto.

FIG. 1 shows an embodiment of the function-monitored guidance system according to the invention in the form of a high-lift system 1 for adjusting at least one system component in the form of at least one adjustable flap A1, A2, B1, B2 and in particular at least one landing flap on each aerofoil. In FIG. 1 two landing flaps per aerofoil are illustrated, the aerofoil s not being shown in the illustration according to FIG. 1. More specifically: an inner landing flap A1 and an outer landing flap A2 are shown on a first aerofoil and an inner landing flap B1 and an outer landing flap B2 are shown on a second aerofoil. One or more than two landing flaps per aerofoil may also be provided in the high-lift system according to the invention. To adjust the adjustable flaps A1, A2, B1, B2, the flap is coupled by means of at least two adjustable flap control devices A11, A12, B11, B12, A21, A22, B21, B22, which are coupled to each adjustable flap A1, A2, B1, B2, are spaced in the direction of span of the adjustable flap A1, A2, B1, B2, control the movement of the respective adjustable flap and drive the respective adjustable flap.

Figure 4:
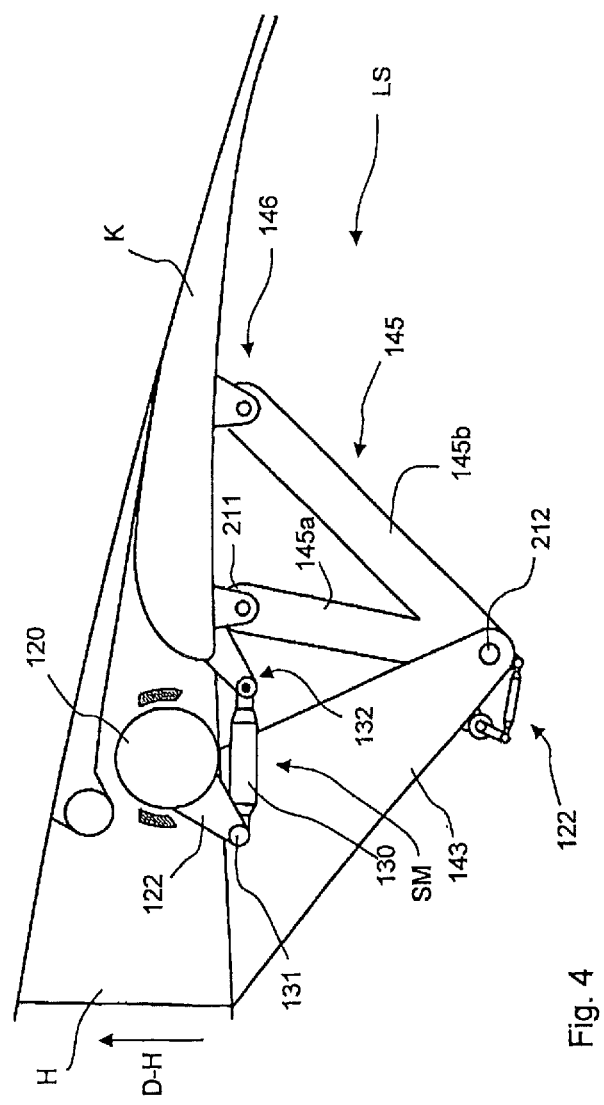
FIG. 4 is a schematic view of a rotary actuator as a component of the function-monitored guidance system according to the invention according to FIGS. 1 to 3, to which a sensor device according to the invention can be attached.

The adjustable flap control devices A11, A12, B11, B12, A21, A22, B21, B22 perform a support function, via which the adjustable flaps are mounted movably on the main wing H under certain kinematic conditions such as the permittance of rotation of the flap, and also perform a positioning function, via which the position of the adjustable flaps is adjustable in relation to the main wing H. The positioning function may in particular be carried out by means of a guiding mechanism SM and the support function may be carried out by means of a bearing station or control station LS. An embodiment of these is shown in FIG. 4. With the "dropped-hinge kinematics" shown in that instance, at least one hinge support 145, which is formed of two hinge supports 145*a*, 145*b* in the embodiment illustrated, is guided to the bearing hinge 212, via which the hinge support is articulated to the fastening strut 143, which is fixed to the main wing H. The hinge support 145*a* is mounted rotatably at its ends in the hinges 211 and 212, and the hinge support 145*b* is mounted rotatably at its ends to the hinges 146 and 212.

Figure 3:
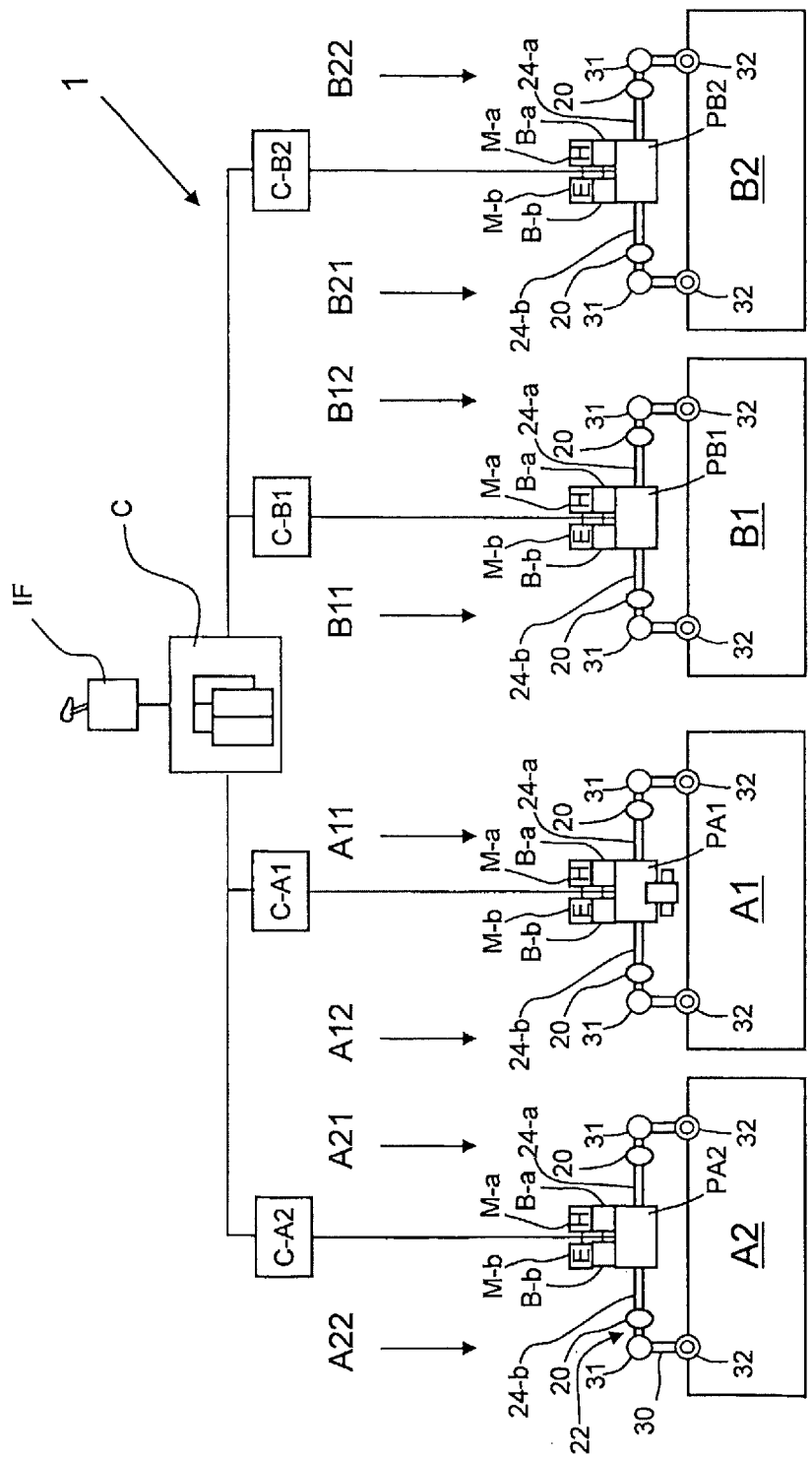
FIG. 3 is a schematic view of a further embodiment of the function-monitored guidance system according to the invention in the form of a high-lift system of an aircraft comprising adjustable flaps.

In the embodiment of the control device illustrated in FIG. 3, the adjustable flaps A1, A2, B1, B2 and K are mounted movably on the main wing H of the aerofoil, in each case by means of a bearing device or bearing station LS. Furthermore, each adjustable flap A1, A2, B1, B2 and K is coupled to a control station comprising at least guiding mechanism SM, wherein the guiding mechanism SM is designed in such a way that it can collect power transferred to it from the drive device P or PA1, PA2, PB1, PB2, and convert it into an adjusting movement of the adjustable flap mounted on the bearing station.

The at least one bearing device LS of control device allocated to a flap may generally comprise dropped-hinge kinematics or "Fowler kinematics". Fowler kinematics may be formed for example as "track kinematics", as "track-line kinematics" or as "linkage kinematics". Track kinematics is formed of a combination of a rail and a carriage movable on the rail and forms an integrated unit for adjusting and mounting the respective adjustable flap. To adjust the adjustable flap, a control device is coupled to the carriage so that the control device accordingly moves the carriage on the rail (track) and thus the flap, owing to the actuation by the respective associated drive device. The control device may be formed of a rotary actuator or a spindle drive which is coupled to the carriage so as to move it. With dropped-hinge kinematics the bearing device is formed of a hinge support which is attached to the main wing in the region of the trailing edge thereof and protrudes away downwardly therefrom. The flap is articulated to the outer end of the hinge support by means of a mount attached to the main wing. The control device may be coupled in particular to the flap and formed of a rotary actuator.

The high-lift system 1 is actuated and controlled via an interface which in particular comprises a pilot interface IF and an actuating member such as an actuating lever. The actuating member IF is coupled functionally to a control and monitoring device C which transmits control commands via a control line Cl to control a drive device P. The control and monitoring device C is formed in the embodiment according to FIG. 1 as a "central" control and monitoring device C, that is to say it comprises control and monitoring functions for a plurality of, and in particular all control devices Al1, Al2, B11, B12, A21, A22, B21, B22 of the high-lift system 1.

The integrity determination function for determining the integrity of the adjustment component is preferably integrated in the control and monitoring device C.

The central drive device P, which is arranged for example in the fuselage area, may be formed with one or more drive motors. In particular a coupling gear unit may couple the outputs of the motors. In the illustrated embodiment of the high-lift system 1, the drive device P comprises two drive motors M1, M2, which for example may be formed by a hydraulic motor and an electric drive. Furthermore, the drive device P may comprise at least one braking device which is associated with the drive motors M1, M2 and can be actuated by a command signal of the control and monitoring device C. In the embodiment of the high-lift system illustrated in FIG. 1 the drive device P comprises two braking devices B1, B2, which may each be actuated by a command signal of the control and monitoring device C. The at least one braking device B1, B2 is connected functionally to the control and monitoring device C, which actuates the braking device under predefined conditions and can thus lock the rotary shaft drivetrain 11, 12. In the event of a defect in the drive motor or one of a plurality of drive motors, this motor can be disconnected by the central drive device P or by a drive motor control associated with the at least one drive motor, If the drive device P is formed of only one motor, the drive device may furthermore also be formed with only one braking device. Such a motor may in particular also be formed as a redundant motor, of which the drive function is designed redundantly to increase security against failure.

In the embodiment comprising two motors M1, M2 according to FIG. 1, the drive device P may comprise a differential D which is coupled to the output sides of the hydraulic motor M1 and of the electric motor M2 in such a way that the outputs provided by the hydraulic motor M1 and the electric motor M2 are added together and transferred to rotary shaft drivetrains, in particular in the form of drive rotary shafts 11, 12. The drive rotary shafts 11, 12 are mounted at a plurality of points by means of shaft bearings 13. In the embodiment shown in FIG. 1 of a high-lift system, shaft bearings are illustrated at some points by way of example. The number and location of the shaft bearings 13 are provided according to the design of the high-lift system and its adaptation to the actual circumstances. In the embodiment shown in FIG. 1 of the high-lift system according to the invention, two braking devices B1, B2 are also provided which are connected functionally to the control and monitoring device C. The control and monitoring device C is designed in such a way that it actuates the braking devices B1 B2 and can thus lock the rotary shafts 11, 12 under predefined conditions and in particular if a critical error state is allocated to one of the components of the adjustment system. If one of the two drive motors, for example the hydraulic motor M1 or the electric drive M2 in the illustrated embodiment, is disconnected, the central drive device P delivers an output which is reduced by the amount of the disconnected drive motor owing to the differential, which is designed in such a way that the outputs provided by the hydraulic motor M1 and the electric motor M2 are added together. Only one braking device may be provided instead of two braking devices B1, B2, and only one motor may be provided instead of two motors Ml, M2.

In the embodiment illustrated of the adjustment system, the drive device P is provided for the drive or control of all adjustable flaps A1, A2, B1, B2 belonging to the adjustment system, that is to say at least one adjustable flap per aerofoil, but preferably a plurality of adjustable flaps A1, A2 and B1, B2 per aerofoil, by means of corresponding control devices. Such a drive device may be arranged in particular in a central location, that is to say in particular in the fuselage of the aircraft. A total of two drive devices, in particular in the form of drive rotary shafts 11, 12 are coupled to the drive device P, in each case for actuating the at least one flap A1, A2 and B1, B2 per aerofoil. The two drive rotary shafts 11, 12 are coupled to the central drive device P and are synchronised with one another thereby. Owing to corresponding control commands, the central drive device P moves the drive rotary shafts 11, 12 to exert rotary adjusting movements of the control devices A11, A12, B11, B12, A21, A22, B21, B22, coupled thereto, of the respective adjustable flap A1, A2 and B1, B2. A load limiter or torque limiter L is integrated in a shaft portion of the drive rotary shafts 11, 12 arranged in close proximity to the drive device P.

At least one adjustable flap control device A11, A12, B11, B12, A21, A22, B21, B22 is coupled to each flap A1, A2 and B1, B2 for control thereof. In the high-lift system 1 illustrated in FIG. 1, two adjustable flap control devices A11, A12 or B11, B12 or A21, A22 or B21, B22 are arranged on each adjustable flap A1, A2 and B1, B2, more specifically the adjustable flap control devices A11, a12 and B11, B12 on the inner adjustable flaps A1 and B1, and the adjustable flap control devices A21, A22 and B21, B22 on the outer flaps A2 and B2. All adjustable flap control devices, that is to say generally at least one adjustable flap control device which actuates a total of one flap in each case, may also be referred to as a control station.

The adjustable flap control devices B11, B12, B21, B22 will be described hereinafter with reference to FIG. 2 and the adjustable flaps B1, B2, wherein the components of different adjustable flap control devices B11, B12, B21, B22 performing the same function are provided with the same reference numeral in each adjustable flap control device B11, B12, B21, B22. An embodiment of the adjustment system and in particular of the high-lift system 1 is illustrated in FIG. 3.

Each of the adjustable flap control devices B11, B12, B21, B22 (in the illustration of FIG. 1 each of the adjustable flap control devices A11, A12, B11, B12, A21, A22, B21, B22) comprises a transfer mechanism UM for transmitting the output of the respective associated drive device P or PA1, PA2, PB1, PB2, an actuator 20 coupled thereto or a step-down gear 20, and a guiding mechanism SM coupled to the actuator 20 for kinematic coupling of the actuator 20 to the adjustable flap K or A1, A2; B1, B2.

Generally, the actuator 20 is coupled directly or via the transfer mechanism UM to the output of the drive device. This may be achieved by means of the output gear or step-down gear 25. In the embodiment shown in FIG. 1 such an output gear or step-down gear 25 is provided to transfer the movement of the respective driveshaft 11, 12 and the output transmitted thereby to a corresponding input and in particular an input shaft of a drive part or drive element 21 and to convert this into a movement of a drive part or drive element 21 which is coupled to the actuator 20 so as to transfer an input movement to an input element 21 or a "downdrive link" on the input side of the actuator 20. The actuator or step-down gear 20 is coupled mechanically to the respective drive rotary shafts 11, 12 and converts a rotary movement of the respective drive rotary shafts 11, 12 into an adjusting movement of the flap region which is coupled to the respective control devices B11, B12, B21, B22.

It may be that a position sensor 26 is arranged on each control device B11, B12, B21, B22 of a flap (FIG. 2) and determines the current position of the respective adjustable flap A1, A2, B1, B2 and sends this position value to the control and monitoring device C via a line (not shown).

The actuator 20 is generally coupled to the adjustable flap A1, A2, B1, B2 via a guiding mechanism SM for kinematic coupling of the actuator 20.

The actuator 20 generally further comprises an output element or drive element 22 which is coupled to a flap-side coupling device 30 to couple the actuator 20 to the respective adjustable flap. A movement of the output element 22 is thus transferred to a movement of the respective adjustable flap A1, A2, B1, B2. A mechanical transfer mechanics having a transfer function, may be provided between the input element 21 and the output element 22.

In addition, an asymmetry sensor 28 may be arranged at the ends of the drive rotary shafts 11 and 12 which is likewise connected functionally via a line (not shown) to the control and monitoring device C and, via this line, sends a current value to the control and monitoring device C which states whether the ends of the drive rotary shafts 11 and 12 are rotated within a predefined range or whether the rotational position of the drive rotary shafts 11 and 12 is asymmetrical.

Furthermore, a wing tip brake WTB may be arranged on each drive rotary shaft 11 and 12 and can block the drive rotary shaft or the respective drivetrain 11 or 12 upon actuation. One of the wing tip brakes WTB is arranged in particular on a point of the drive rotary shafts 11 and 12 in an outer region of the respective wing. Each of the wing tip brakes WTB is connected functionally to the control and monitoring device C via a line (likewise not shown) and may be controlled and actuated by the control and monitoring device C via this line. During operation, the normal starting state of the wing tip brake WTB is an unactuated state, in which it does not interfere with the rotation of the drive rotary shafts 11 and 12. With a corresponding control signal from the control and monitoring device C, the wing tip brakes WTB may be actuated so as to lock the respective associated drive rotary shaft 11 or 12.

In an embodiment shown in FIG. 4 of a drive device, the actuator is formed as a rotary actuator 120 and the output element is formed as an actuator lever 122 and the drivetrain 130 or connecting lever which couples the actuator to the adjustable flap K via hinges 131, 132. A first hinge 131, via which the drivetrain 130 is articulated to the actuator lever 122, and a second hinge 132, via which the drivetrain 130 is articulated to the adjustable flap K, are provided.

The adjustable flap is articulated to the main wing H by means of at least one bearing device LS, wherein in the embodiment of FIG. 3 this is formed as a bearing device LS having dropped-hinge kinematics. The bearing device LS comprises a fastening strut 143 on the main wing H extending downwardly therefrom in relation to the direction of thickness of the wing D-H and in which a bearing hinge 212 is provided. A supporting device in the form of a hinge support 145 is articulated to the bearing hinge 212 and is fixed or mounted on an adjustable flap K by means of a fastening device 146. The actuator is designed as a rotary actuator 120. The sensor or sensor device provided in accordance with the invention may be arranged in particular on each of the hinges 131, 132, on the drivetrain 130 or on or in the housing of the rotary actuator 120. The term "sensor device" means the combination of the actual sensor and optionally the sensor with a signal or data evaluation module. In the latter case, the signal or data evaluation module prepares signals or data which can be processed by the monitoring device having the operating state determination function provided in accordance with the invention.

In an alternative embodiment of the management device as track kinematics (not shown in the figures), an actuator which for example may be a rotary actuator or a spindle drive may be coupled to the carriage, wherein a drivetrain (similarly to the drivetrain 130) is arranged on the carriage via a first hinge and on the adjustable flap via a second hinge.

Figure 2:
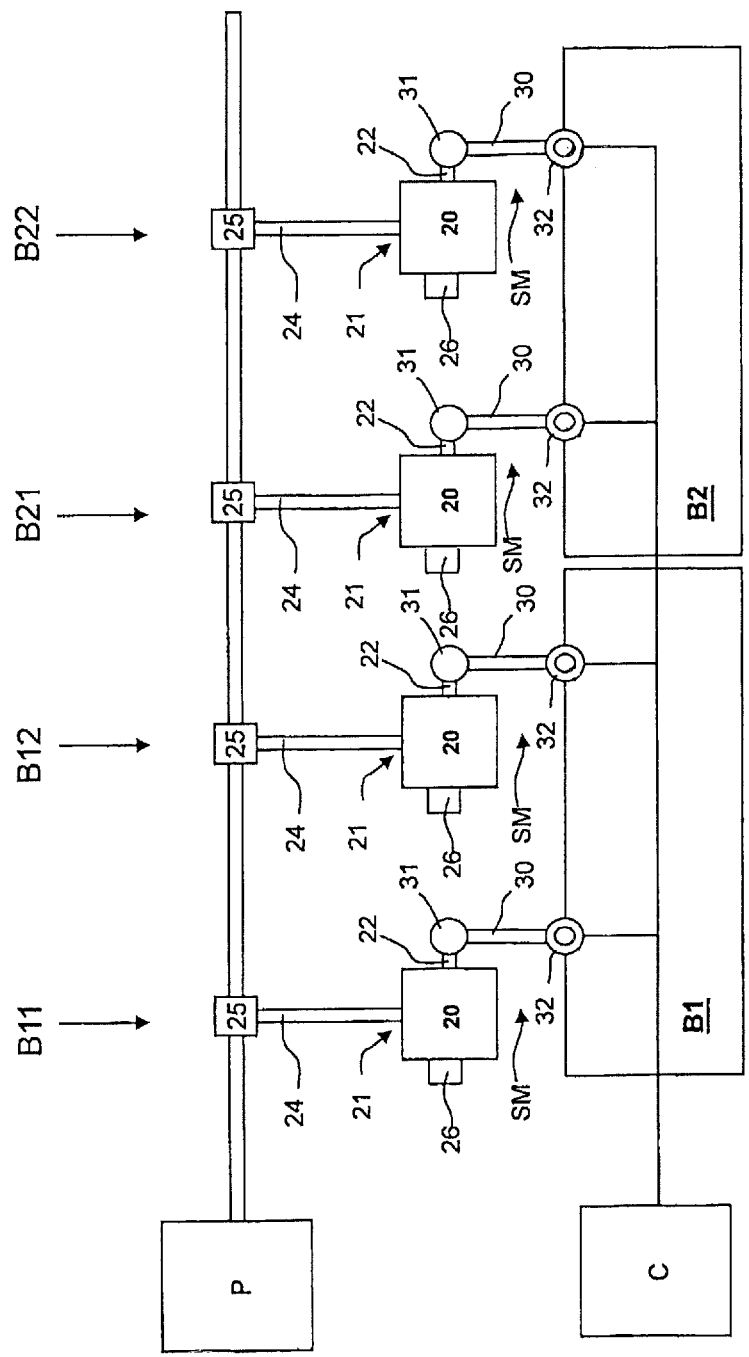
FIG. 2 is an enlarged view of the part of the high-lift system according to FIG. 1 provided for the wing which is on the right-hand side in relation to the longitudinal axis of the aircraft.

The guidance system shown in FIGS. 1 to 3 is thus a high-lift system, of which the at least one system component to be adjusted by the guidance system is at least one adjustable flap A1, A2; B1, B2 arranged on each wing. The high-lift system thus comprises a plurality of adjustment components for guiding adjusting movements of the adjustable flap A1, A2; B1, B2, K. At least one of these adjustment components comprises a sensor device for detecting a load state of the adjustment component. In accordance with the invention the sensor device may be designed in particular in such a way that it detects the load state via vibration properties, occurring within a period of time, of the adjustment system kinematics. In particular, the sensor device may thus be a piezo vibration sensor, a microphone, an acceleration sensor, a torque sensor, a strain gauge sensor or a combination of such sensors.

The sensor device S for detecting a load state of the respective adjustment component may generally be attached to the housing or within the housing of the respective adjustment component. In the function-monitored guidance system or high-lift system according to the invention, the sensor device S or the sensor thereof may be arranged on and attached to one or more adjustment components thereof:

to the rotary actuator 120,
generally in hinges or bearings or control parts of the guiding mechanism SM,
to or in at least one of the shaft bearings 13 of the drive rotary shafts 11, 12,
on or in the output gear or step-down gear 25,
on or in the drive device P and in particular in or on one or both of the two drive motors M1, M2 and/or one or more of the at least one braking device B1, B2 and/or in the differential D.

With the arrangement of the sensor device S in the guiding mechanism SM and the design thereof as dropped-hinge kinematics or Fowler kinematics, this may be arranged in particular on the actuator level 122 and/or on the drivetrain 130 or the connecting lever. In this case the sensor device S may also be arranged on or in the drivetrain 130 via the hinge 131 coupling the actuator lever 122 and/or the hinge 132 coupling the actuator to the adjustable flap K.

Alternatively or additionally, the sensor device S may be arranged on the input element 21, the output element 22 of the actuator 20 coupled to the flap-side coupling device 30, and/or the mechanical transfer mechanics coupled between and having a transfer function, or integrated in these kinematic modules or adjustment components. In particular, it may be formed in these cases as a vibration sensor or as a load sensor, in particular in the form of a strain sensor or a combination of the two.

With the arrangement of the sensor device S in the guiding mechanism SM and the design thereof as track kinematics, it may be arranged in particular on and/or in the bearings of the track guiding device, on which the adjustable flap K is guided, and/or the connection components guided thereon, for example the wagon on which the coupling device is coupled for coupling thereof to the adjustable flap K. Alternatively or additionally, the sensor device S may be arranged on the actuator, such as a spindle drive and in this case in particular on the bearings thereof.

According to the invention, other types of high-lift system may also be applied. As a further example the alternative embodiment illustrated, in contrast to FIGS. 1 and 2, of a high-lift system according to FIG. 3 is described in this regard. The components which, in the embodiment according to FIG. 3, are similar to the components of the embodiment of a high-lift system described with reference to FIGS. 1 and 2 or are components of equivalent or similar function, are provided with the same reference numerals.

In the embodiment illustrated in FIG. 3 decentral or local control and monitoring devices C-A1, C-A2, C-B1, C-B2 may be provided which are associated, preferably in the main wing and in the span direction thereof, with the control devices A11, A12, B11, B12, A21, A22, B21, B22 of the adjustable flaps A1, A2, B1, B2 and K thereof, and are preferably arranged locally in the spatial vicinity thereof, which the respective local control and monitoring device C controls. An error detection function and reconfiguration function with regard to the respective associated control devices A11, A12, B11, B12, A21, A22, B21, B22 may be provided in each local control monitoring device C-A1, C-A2, C-B1, C-B2. In particular, the integrity determination function for determining the integrity of the adjustment component is integrated as a function in each of the local control and monitoring devices C-A1, C-A2, C-B1, C-B2. With such a design a central control and monitoring device C is also provided which determines and controls intended adjustment positions for each of the local control and monitoring devices C-A1, C-A2, C-B1, C-B2. The central control and monitoring device C receives from the local control and monitoring device C-A1, C-A2, C-B1, C-B2 the allocation of an error state at a control device or the control devices A11, A12, B11, B12, A21, A22, B21, B22 of a adjustable flap A1, A2, B1, B2 and K if an error has been recognised here or if a sensor value deviation has been determined.

In the embodiment according to FIG. 4 a adjustable flap drive device PA1, PA2, PB1, PB2 is provided for each adjustable flap A1, A2, B1, B2, each of which adjustable flap drive devices may comprise at least one motor and at least one braking device. In the embodiment illustrated, each adjustable flap drive device PA1, PA2, PB1, PB2 comprises two motors M-a, M-b and a gear unit which is coupled to the output sides of the first braking device M-a formed as a hydraulic motor (reference sign H) and of the second braking device M-b formed as an electric motor M2 (reference sign E) in such a way that the outputs provided by that formed as a hydraulic motor H and that formed as an electric motor E are added together and transferred to drive rotary shafts 24-a, 24-b. The at least one braking device is connected functionally to the associated decentral control and monitoring device C-A1, C-A2, C-B1, C-B2. The control and monitoring devices C-A1, C-A2, C-B1, C-B2 are designed in such a way that they actuate the at least one braking device B-a, B-b and can thus lock the rotary shaft drivetrain 24-a, 24-b under predefined conditions and in particular upon allocation of a critical error state to one of the components of the adjustment system. The adjustable flap drive devices PA1, PA2, PB1, PB2 are designed in such a way that the failure of one of the two drive motors, in the illustrated embodiment for example the hydraulic motor H or the electric drive E, can be compensated for with the effect that the output of the gear unit is halved. Furthermore and as can be derived similarly from FIG. 2, the high-lift system illustrated in FIG. 3 comprises: an actuator 20 having an input element 21 and in particular an input shaft as well as a drive element 22, in particular in the form of an adjusting lever (lever 122 in FIG. 4), or an output shaft having a corresponding bearing which is coupled to a flap-side coupling device 30 for coupling the actuator 20 to the respective adjustable flap A1, A2, B1, B2 and K. The coupling device 30 is illustrated in FIG. 4 as a drivetrain 130. In this case it should be considered that a sensor device S, in particular in the embodiment as a vibration sensor or strain sensor, in particular in the form of at least one strain gauge, normally has a greater measuring accuracy in a central area of the longitudinal extension of the coupling device 20 or drivetrain 130 and that the measuring accuracy decreases from there towards the edge regions.

According to the embodiment of FIG. 3, the sensor device S provided in accordance with the invention may be arranged or provided in those components as described in the embodiment of FIGS. 1 and 2, and the sensor device S may be arranged on and attached to one or more adjustment components thereof:

to the rotary actuator 20 or 120,
generally in hinges or bearings or control parts of the guiding mechanism SM, as described herein with reference to the embodiment illustrated in FIGS. 1 and 2,
to or in at least one of the shaft bearings of the rotary shaft drivetrains 24-*a*, 24-*b*,
on or in the adjustable flap drive device PA1, PA2, PB1, PB2, and in particular in or to one or both of the two drive motors M-a, M-b and/or one or more of the at least one braking device B-a, B-b and/or in the differential of the adjustable flap drive device PA1, PA2, PB1, PB2.

The term "to" in this regard means in particular the attachment of the sensor device S to the housing of the respective component.

Figure 5:
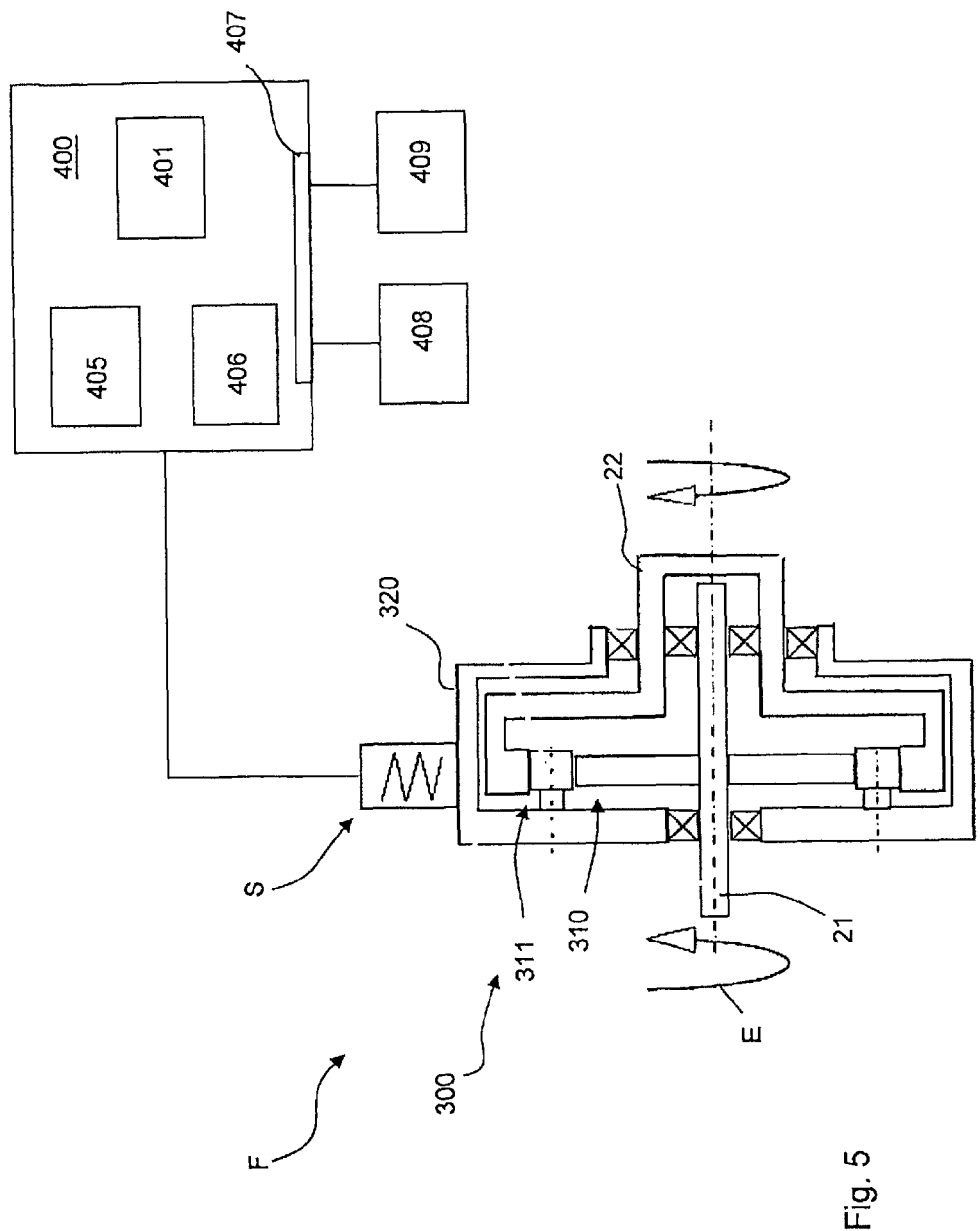
FIG. 5 is a cross-sectional view of a rotary actuator according to FIG. 4 having a sensor device attached thereto and also a schematic view of the monitoring system, which is connected functionally to the sensor device, as part of the function-monitored guidance system according to the invention.

FIG. 5 shows a section through a rotary actuator 300 as an embodiment of a adjustment component. The rotary actuator 300 may in particular be used for the actuator 20 in FIG. 1, 2 or 3. The rotary actuator 300 comprises: a housing 320 and, arranged inside said housing, components of the transfer mechanics of the rotary actuator 300, in particular the input element 21 and the output element 22 coupled to the flap-side coupling device 30 and the mechanical transfer mechanics 310 coupled between and having a gear unit 311. In the illustrated embodiment of the rotary actuator according to the invention the sensor device S is attached to the outer face of the housing of the rotary actuator 300. In particular, this may be designed as a vibration sensor or as a load sensor, in particular in the form of a strain sensor or a combination of the two. In particular, the sensor device S may be attached in the form of a strain sensor to the input shaft 22 or the output shaft 22.

FIG. 5 shows part of an embodiment of the function-monitored guidance system according to the invention comprising the rotary actuator 300 as a general example of a adjustment component as part of the function-monitored guidance system according to the invention which can be moved in a high-lift system, generally in a adjustable flap system of an aircraft, comprising the adjustable flaps for control thereof, or which can be used in another kinematically moved system as a adjustment component. The rotary actuator 300 may, for example, be used as a adjustment component in a lorry for special applications or in a crane. For application of the invention, as designed in the description of the invention with reference to FIGS. 1 to 3, other adjustment components may also be considered as rotary actuators however, for example generally actuators or bearings of transmission shafts.

The adjustment component according to the invention is generally a component of a guiding mechanism, which is not shown in FIG. 5 and is only indicated by an arrow E to indicate the movement of the input shaft and by an arrow A to indicate the movement of the output shaft to carry out the adjusting movement generated by the adjustment component to move a component to be moved. In FIG. 5, a monitoring device 400 according to the invention having an integrity determination function implemented therein to determine of the integrity of the adjustment component and in particular to determine a level of wear of a mechanical device is also shown in addition to the adjustment component in the form of the rotary actuator 300. The sensor device S is attached to a point of the adjustment component and, in the illustrated embodiment, to the outer face of the housing 320 of the rotary actuator 300, and is connected functionally to the monitoring device 400, which comprises a processing unit. The monitoring device 400 has a control function 405 with an operating state determination function or integrity determination function, a program store 406 and a drive control 407 having an interface to a drive function of the guidance system. The control device 400 may comprise an input device 408 and a user interface 409, optionally with a display device, which are each connected functionally to the control function or operating state determination function 405. With the design of the guidance system F as a high-lift system, as is described herein by way of example with reference to FIGS. 1 to 3, the control function or operating state determination function 405 may be carried out by the control and monitoring device C and the input device 408 by the pilot interface IF, which is connected functionally to the drive device P via the control line C1, and in particular may be integrated functionally with the control and monitoring device C. In this case the monitoring device 400 may be formed as part of the high-lift system. Alternatively, the control function 405 may be formed by a monitoring module which is separate from the high-lift system and in particular as a maintenance device which is connected functionally to the at least one sensor device S and is optionally connected functionally to the high-lift system for receipt of values and data produced therein.

The sensor device S comprises at least one sensor and may optionally comprise a sensor signal processing device connected functionally thereto for evaluation of the sensor signals generated by the sensor. The sensor and sensor signal processing device are connected functionally to the monitoring device 400 for the transfer of sensor signals and sensor values generated by the sensor and sensor signal processing device. Such a sensor device S or a plurality of such sensor devices S may be arranged on a adjustment component. The sensor may in particular be an acceleration sensor, a gyro sensor or a vibration sensor.

In the embodiment illustrated in FIG. 5, the sensor device S is attached directly above the gear unit 311 formed as a planetary gear and generates, owing to the oscillations coming from the adjustment component and from the rotary actuator 300 during operation of the guidance system F, sensor signals corresponding thereto. These are transferred from the sensor device to the operating state determination function or control function 405 or are requested by the operating state determination function or control function 405. In this way, the integrity determination function receives measuring signals or all measuring signals from the sensor device S, and the control function 405 can be designed in such a way that these are stored in the program store 406.

According to the invention the operating state determination function or integrity determination function determines at least one value for the functional integrity of the adjustment component based on these sensor signals or sensor values. Based on this value, the functional integrity is allocated to the adjustment component. According to an embodiment of the invention, the determined operating state is recorded in the monitoring device 400 and is evaluated in an evaluation function 401 or a system function or system functions, or is forwarded to a system function connected functionally to the monitoring device 400 for evaluation. Alternatively or additionally, the value of the operating state determined in each case is displayed by the display device 409.

The value of functional integrity may be used in particular for maintenance purposes. In this regard the system function connected to the monitoring device 400 for evaluation of the operating state may be a maintenance device. The maintenance device may in particular comprise a user interface 409, via which the respective values determined for the operating state and/or a series of values determined for the operating state and optionally further information, in particular regarding the state of the guidance system F, are provided. These values and information may also be presented by the user interface 409 and optionally presented visually by means of a display device. For the interactive provision and presentation of the data, said data may be provided via an input device 9. The user interface 409 may in particular be a standardised interface.

According to the invention the operating state determination function 405 or the integrity determination function in particular may provide at least one predefined or determined detection time period and at least one predefined or determined threshold value G based on the amplitudes of the sensor signals, and may determine a number of overshoots of at least one threshold value G by the captured sensor signal and/or a number of undershoots of at least a further threshold value G by the captured sensor signal, in each case within the at least one detection time period, and from this determine a value for the operating state of the adjustment component 20, 120, 300 or of the operating system.

The sensor device S is designed in such a way that the signal values generated thereby can be used to detect a load state of the adjustment component from an evaluation function or evaluation device 410, in particular since the oscillation properties of the adjustment system kinematics occurring within a time period are determined.

For this purpose the control function 405 may comprise, in particular, a start function for determining a value for the operating state and/or a stop function via which the determination of a value for the operating state is stopped.

By means of the start function, the operating state determination function 405 or control function initiates the detection time period or the determination of the operating state. For this purpose a predefined start level may be stored in the control function 405. A comparative function of the control function 405 compares captured sensor signal values with the start level. This comparison may be carried out in particular at given intervals or as a result of an operating phase of the guidance system F. the operating phase may be given upon an actuation or upon each actuation of the guidance system F. If the guidance system F is designed as a high-lift system 1, the relevant operating phase, during which the start function is initiated based on a adjustable flap or a guiding mechanism SM, may be given upon an actuation and therefore upon each actuation of adjustable flaps, or upon only specific actuations, such as in particular upon extension of the adjustable flaps to a first extended position at the start of the landing phase and/or to the maximally extended position at the start of the final approach.

The start function may be designed in such a way that determination of the operating state or functional integrity is initiated when the start function determines that the signal values are above the start level over a predefined initiating time period. In particular, the start function may be designed in such a way that the determination of the functional integrity is initiated when a minimum number of overshoots of the start level is determined within a predefined initiating time period.

In addition, the operating state determination function 405 may comprise a stop function for ending the detection time period or for ending the determination of the functional integrity. The stop function is designed in such a way that a predefined stop level below the start level is stored in it, and it comprises a comparison function with which the stop function compares captured sensor signal values to the stop level. Furthermore, the stop function is designed in such a way that the determination of functional integrity is stopped when the comparison function determines that the signal values are below the stop level over a predefined initiating time period.

According to a further embodiment of the invention, the integrity determination function may be designed in such a way that it produces, from a plurality of detection time periods after activation or initiation of the determination of functional integrity, a series of measured values, from the time curve of which based on the respective adjustment component on which the respective sensor is arranged, an operating state or maintenance state is derived or a plurality of operating states or maintenance states is derived. A particularly critical maintenance state may be evaluated by the evaluation function 410 of the guidance system F as an error state and allocated to the adjustment component on which the sensor device is arranged.

The operating state or functional integrity of each of the plurality of detection time periods is determined in each case by means of the start function. It may be that, for the allocation of a relatively critical operating state or maintenance state to a adjustment component, a greater number of overshoots has to be determined within a detection time period by a subsystem of the operating system F or the operating system as a whole than in the case of allocation of a less critical operating state or maintenance state, in which a maintenance measure such as in particular the replacement of the respective adjustment component has to be carried out. The allocation of a maintenance state may mean, in particular in one embodiment of the guidance system F, that the guidance system F can be operated further, provided an error state has not yet been allocated to a adjustment component.

In the embodiment of the guidance system F as a high-lift system 1, in a high-lift system according to FIG. 1 the control and monitoring device C may disconnect the drive device P if, by means of a sensor arranged on a adjustment component driven by the drive device P, a sensor signal is generated which leads to an allocation of a critical operating state of the adjustment component. In another embodiment of the high-lift system and in particular in the embodiment of the high-lift system 1 according to FIG. 3, in this case the control and monitoring device C might only disconnect a control valve drive device PA1, PA2, PB1, PB2 if a sensor device is integrated in said control valve drive device PA1, PA2, PB1, PB2, via which sensor device a critical maintenance state or even error state has been allocated to a adjustment component in the respective control valve drive device PA1, PA2, PB1, PB2 in accordance with the invention. In this case a sensor device is preferably arranged in each drive device PA1, PA2, PB1, PB2 in at least one adjustment component thereof and is integrated therewith.

According to a further embodiment of the invention the integrity determination function may be designed in such a way that it allocates the requirement of a maintenance measure from at least one determined value for functional integrity without allocation of an error state. If the adjustment component is part of a guiding mechanism SM, for example a high-lift system, the control function of the monitoring device 400 may allocate a maintenance requirement to the adjustment component if a corresponding specification of overshoots of the threshold value within at least one detection time period is met. According to an embodiment of the function-monitored guidance system according to the invention, the monitoring device may thus use the determined value for the operating state for the assessment of a maintenance state and/or an error state of the guidance system F, wherein in particular if a first minimum number of overshoots of the predefined threshold value is exceeded within the detection period, an operating state and in particular maintenance state is allocated to the adjustment component, with which the requirement of a maintenance measure is displayed, and if a second minimum number of overshoots of the predefined threshold value is exceeded, a more critical operating state or maintenance state and optionally an error state is allocated to the adjustment component. In the latter case, the guidance system F and in particular the high-lift system F are designed in such a way that a reconfiguration of the guidance system F is implemented, such as in particular the disconnection of the guidance system F or the disconnection of the drive device to which the adjustment component is coupled. In the embodiment of the high-lift system 1 according to FIG. 3, if an error state is allocated to a adjustment component of a adjustable flap control device A11, A12, B11, B12, A21, A22, B21, B22, the respective adjustable flap control device A11, A12, B11, B12, A21, A22, B21, B22 and therefore the actuation of the relevant adjustable flap A1, A2, B1, B2 may be disconnected, or if a critical operating state and optionally an error state is allocated to a drive device A1, A2, B1, B2, said drive may be reconfigured to a second actuation path or the actuation of the relevant adjustable flap A1, A2, B1, B2 may be disconnected.

In an embodiment of the monitoring device 400, said device may keep available the number of overshoots of the threshold value during the detection periods and may automatically, or upon request, transfer this information to:
  a monitoring function or maintenance function within the monitoring device 400 and/or
  a further system module, such as a maintenance module or a maintenance function, associated functionally with said device, and/or
  an external user device.

In an embodiment of the monitoring device 400, the control function 405 may further be designed in such a way that the number of overshoots captured by means of the sensor device S is stored in the program store 406 in each case. Furthermore, the monitoring device may be designed in such a way that it emits this maintenance requirement together with an identification reference of the adjustment component concerned to the user interface or keeps it available for a request therefrom.

An external maintenance device may be connectable via the user interface 409. By means of such a maintenance device and/or the user interface 409 can optionally be transferred: the relevant adjustment component, the at least one detection time period during which values for the integrity of the adjustment component are determined, optionally the respective value determined for the integrity of the adjustment component by means of such a maintenance device. In the embodiment of the guidance system F as a high-lift system 1, the at least one value for the integrity of the adjustment component may be read out or transferred during a ground test, for example between two flights.

The detection periods may be selected in different ways. In accordance with an embodiment according to the invention, detection periods of a predefined duration may follow one another successively at constant intervals. In particular, when determining the number of overshoots in each of the detection time periods, the predefined first minimum number of overshoots for allocation of a maintenance state and/or the predefined first minimum number of overshoots for allocation of an error state may increase as a whole or may increase progressively in the sequence of detection periods from one detection period to the subsequent detection period. This affords the advantage that the wear of a adjustment component is determined in a calibration process, that is to say by a test, for the standard case under predefined conditions based on at least one threshold value by means of the overshoots, occurring in the respective detection period, of at least one respective predefined threshold value. Depending on the operating period of the relevant adjustment component at which, and up to which the respective detection period is provided, the number of overshoots by the sensor value captured in the respective detection period may be used as a measure for:
  the derivation of a threshold value allocated to a respective detection period to determine a maintenance state and/or an error state and/or
  with the stipulation of at least one threshold value, the derivation of a number of overshoots of the respective threshold value to determine a maintenance state and/or an error state.

In this way, a first minimum number of overshoots of a predefined threshold value within the detection period of the adjustment component for allocation of a maintenance state of the relevant adjustment component and/or of at least a second minimum number of overshoots of the same predefined threshold value or of a further predefined threshold value of the adjustment component for allocation of a more critical maintenance state can be determined, of which a particularly critical maintenance state may also be interpreted and assessed as an error state.

Additional threshold values with respective overshoot figures may also optionally be defined according to the operating period of the respective adjustment component.

The monitoring device 400 is designed on the basis of this determined data in such a way that it determines how often the oscillations captured for a adjustment component 300 exceed a threshold value thus predefined or a plurality of threshold values thus predefined. These are compared to a number or minimum number determined as described from the test and to which at least one threshold value is assigned. If the respective minimum value is exceeded, an operating state and in particular a maintenance state and/or error state is allocated to the respective adjustment component.

The detection periods may be defined in various ways:

According to one embodiment a detection period may be defined by at least one operating phase of the adjustment component and/or of the guidance system. For example, in a high-lift system 1, the operating phase may be the first landing phase, during which the adjustable flaps are moved from a retracted position into a first extended position. An operating phase is preferably selected during which the adjustment component is subjected to the greatest external and internal loads. The at least one predefined threshold value and the respective associated predefined comparison value for the minimum number of overshoots may be adapted in particular to predefined standardised conditions. The at least one respective detection period in which the monitoring device 400 detects the number of overshoots of a predefined threshold value is in particular provided in a predefined manner within a predefined operating phase of the adjustment component or guidance system. The detection period may be provided at the start of the respective operating phase. Alternatively, the operating phase may be initiated by a sensor device of a system connected functionally to the guidance system F. In the example of the high-lift system, this further sensor device may, for example, be the air data system, and the operating phase or detection period may be initiated alternatively or additionally by reaching a specific value determined by the air data system, for example a flying altitude and/or flying speed by which the landing phase is defined.

Alternatively, the detection period may be defined by the actuation of the adjustment component and/or the guidance system, wherein in particular a detection period in which the monitoring device detects the number of overshoots of a predefined threshold value may be activated, in particular upon each actuation or upon selected actuations of the adjustment component or of the guidance system.

In the embodiment of the guidance system F according to the invention, it may generally be provided, when determining the number of overshoots in each of the detection time periods, for the predefined, first minimum number of overshoots for allocation of a maintenance state and/or the predefined at least one further minimum number of overshoots for allocation of at least a further more critical maintenance state to increase overall in the sequence of detection periods from one detection period to the subsequent detection period, that is to say to remain the same between a selection of subsequent detection periods or to increase progressively overall.

Further embodiments of the guidance system F according to the invention will be described hereinafter, in particular with reference to the example of a high-lift system 1 having a monitoring device 400:

To determine and store predefined threshold values to determine the number of overshoots or undershoots, a calibration may be carried out, by which for each individual sensor of the used sensor devices S the oscillation behaviour of the adjustment component during operation is captured, that is to say in the case of the high-lift system, for example, during the retraction and extension of the landing flaps. In addition, a normal state or original state of the signal values of the individual sensors can be captured, even under load, that is to say either simulated speeds or actual speeds of the aircraft and with the loads on the landing flaps and the rotary actuators, and can be stored in the monitoring device 400 and in particular the program store 406 as a normal state or starting state.

Generally, a number of overshoots and undershoots of a respective threshold value per detection time period is determined by the implementation of the calibration of an operating phase and in particular of detection time periods, which number is used as a reference measure and in particular is stored in the storage device 406 and, when these available reference numbers are consulted in the storage device 406, are compared in the evaluation function 401 in a comparison with overshoots and undershoots of a respective threshold value per detection time period actually determined in an operating phase. The number of overshoots and undershoots of the respective threshold value determined in the calibrations is captured depending on the usage age of the respective adjustment component in question. "Usage age" is understood herein to mean the period during which the adjustment component is operated after all past operating phases. If the number, actually determined in an operating phase, of overshoots and undershoots of a respective threshold value which, for the respective operating phase in the calibrations, optionally depending on the usage age of the relevant adjustment component, exceeds the determined number of overshoots and undershoots of the respective threshold, a conclusion can be drawn therefrom regarding an operating state of the adjustment component and in particular a maintenance state of the adjustment component. In particular under consideration of the usage age of the adjustment component in question, the characteristic reference oscillation behaviour thereof is taken as a basis for the assessment of the actual operating state.

To carry out the calibration of signal values based on an operating phase of the adjustment component or of the guidance system F, all signal values of the at least one sensor S are captured during operation of the high-lift system 1 in the respectively determined detection periods during or before flights, in particular depending on the respective operating phase. The detection periods may be allocated at least to one operating phase of the high-lift system 1. In accordance with the invention an operating phase in which a number of overshoots of at least one threshold value G by the captured sensor signal and/or a number of undershoots of at least a further threshold value is/are to be determined may be initiated by the extension and retraction of the high-lift flaps before and during the take-off of an aircraft and/or by the extension and retraction of the high-lift flaps before and during the landing of the aircraft. An operating phase may also be initiated on the airfield before take-off when testing the adjustable flaps and in particular the high-lift flaps by the respective actuation thereof. Such an operating phase may also be provided with an determination of overshoots and undershoots of a respective threshold value continuously during the entire operating phase of the guidance system.

Alternatively or additionally to the aforementioned embodiments, the operating state determination function 405 is designed in such a way that the overshoots and undershoots of a respective threshold value are determined by means of a first threshold value as a triggering threshold value L1, L1' for triggering or initiating the examination as to whether an overshoot or undershoot of a respective threshold value is present, and by means of a second threshold value as an ending threshold value L2, L2' for ending the examination as to whether an overshoot or undershoot of a respective threshold value is present. In particular, the triggering threshold value L1, L1' and the ending threshold L2, L2' are equal.

The operating state determination function may furthermore additionally be designed in such a way that an overshoot of the triggering threshold L1, L1' by the captured sensor signal or a fall in the captured sensor signal below the triggering threshold value L1, L1' is determined in each case by means of a triggering minimum period t1, t1', and/or a fall in the captured sensor signal below the ending threshold L2, L2' or an overshoot of the ending threshold value L2, L2' by the captured sensor signal is determined by mans of an ending minimum period t2, t2'.

These viewpoints are explained further hereinafter with reference to FIGS. 6 to 10:

FIG. 6 shows a general schematic view of a time-oscillation amplitude diagram for a time period of a sensor signal generated by the sensor device owing to the actuation of the adjustment component. The diagram shows the time curve K1 of a sensor signal in schematic form within a detection time period TE within a total temporal course of the operation of the guidance system F illustrated by the time axis t. The amplitude A of the sensor signal is plotted on the ordinate. The curve K1 of the sensor signal has a first local maximum M1 of an excursion thereof in an upwards direction, that is to say towards increasing amplitude values, and a first local minimum M2 of an excursion thereof in a downwards direction, that is to say towards falling amplitude values. The curve K1 also has a further local maximum M3, With regard to a reference line, the distances A1 and A2 of the aforementioned local extremes in relation to a reference line R1 are provided at these points. In FIG. 6 the curve K1 is a sine curve with relatively high amplitude when observing the lower frequencies and is superimposed by a curve of relatively high frequency and low amplitude. The resultant overall signal is not symmetrical about the reference line R1. This and further specific possible properties of a sensor signal curve which is processed in an operating state determination function according to the invention are considered when determining overshoots and undershoots of a respective threshold value by specific functional measures, as will be described hereinafter. The curve K1 illustrated in FIG. 6 within the detection time period TE is illustrated together with a threshold value G, which is identical in the embodiment illustrated in FIG. 7 both to the triggering threshold value L1 and to the ending threshold value L2. An overshoot of the triggering threshold value L1 occurring in a predefined manner and a fall in the captured sensor signal below the ending threshold value L2 occurring in a predefined manner leads to the detection of a threshold value overshoot by the sensor signal in relation to the identical threshold values L1 and L2.

Figure 8:
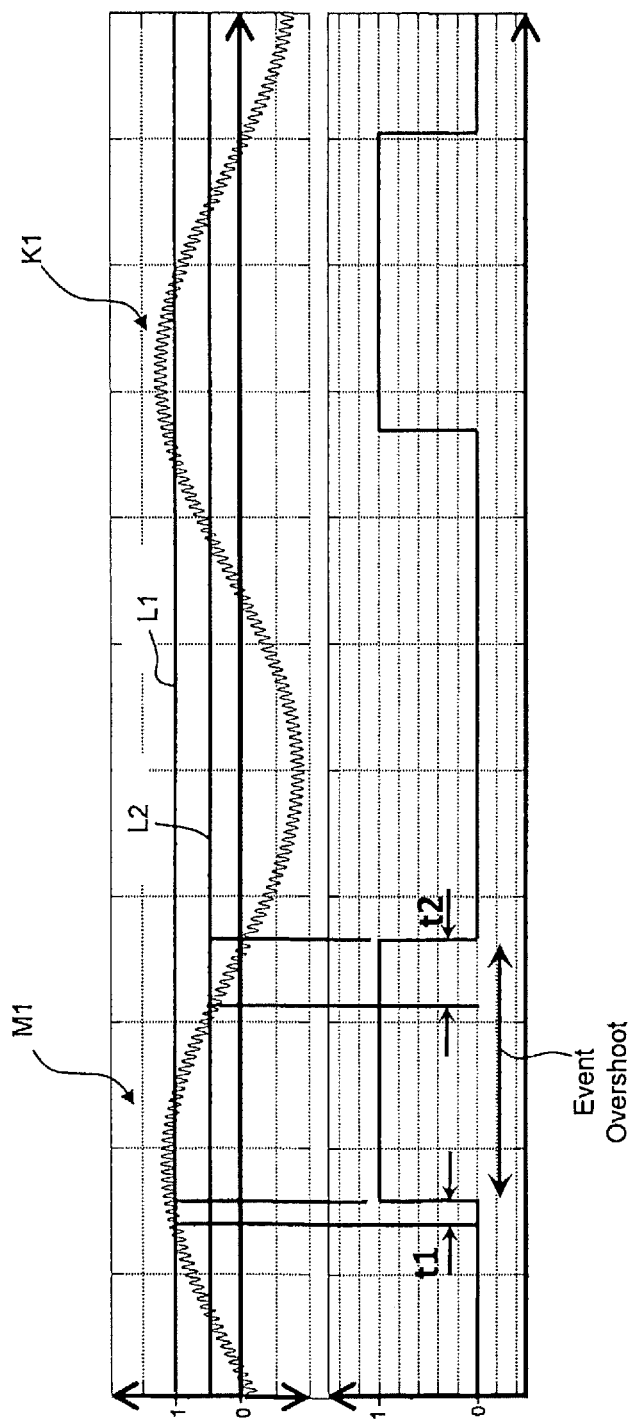
FIG. 8 is a schematic view of a sensor signal in a detection time period according to the invention similar to FIG. 7, wherein the triggering threshold value and the ending threshold value for determining the overshoot of at least one threshold value by the sensor signal have different values.
Figure 9:
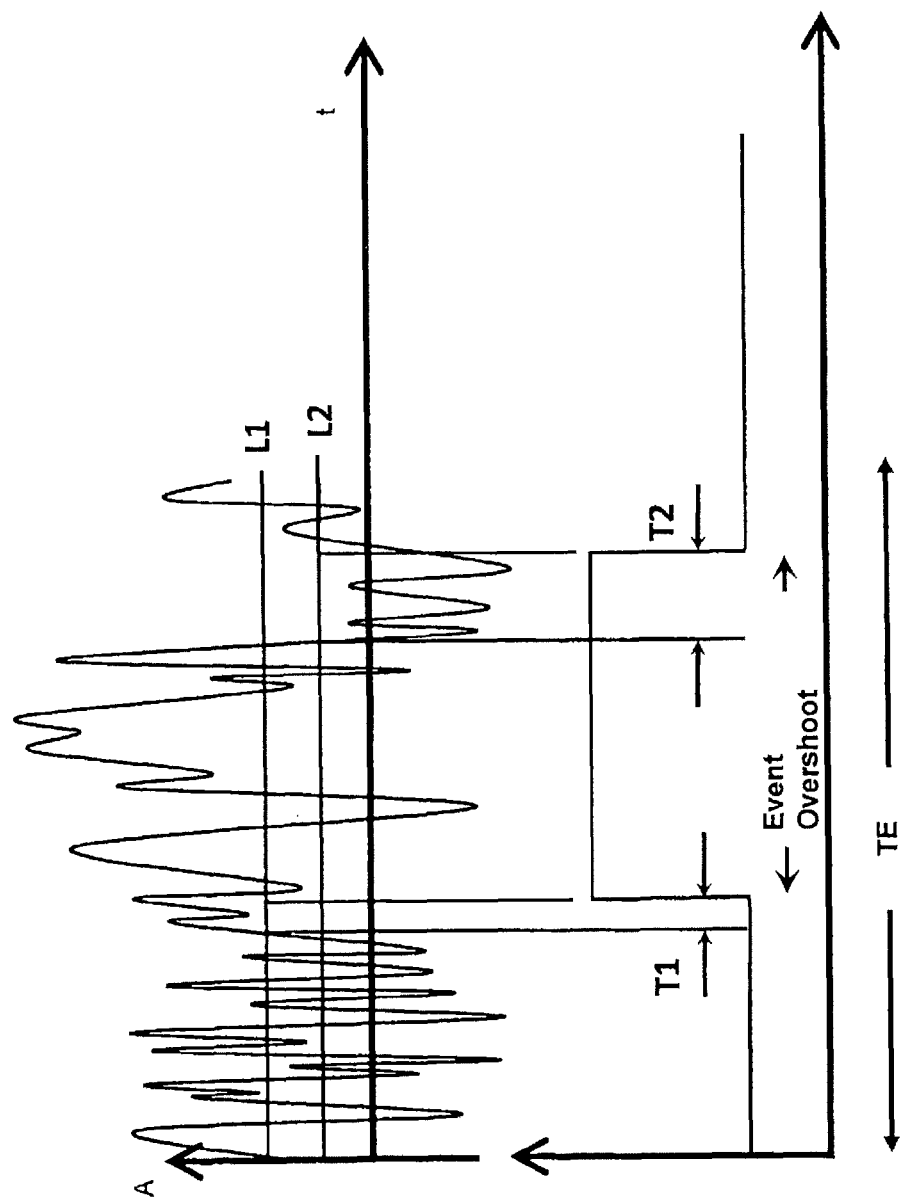
FIG. 9 is a further schematic view of a sensor signal which is different from the sensor signal shown in FIG. 8 in a detection time period according to the invention.

In FIG. 7 the signal processing of an embodiment of the operating state determination function is further illustrated, in which a triggering minimum period t1 and an ending minimum period t2 are used. When the triggering minimum period t1 is exceeded, a plurality of events in a transition area U1 owing to the higher frequency oscillation fraction in the sensor signal occur, in which the sensor signal exceeds the triggering threshold value L1, even though the sensor signal then falls back below the triggering threshold value L1 relatively shortly after, and therefore this event cannot be assessed as an overshoot with in the meaning of the determination of the operating state of the adjustment component. In this regard the triggering minimum period t1 is provided and, as a condition of a predefined overshoot of the triggering threshold value L1, is a period in which it is not possible for the triggering threshold value L1 to be undershot from a specific overshoot event i.e., designated "Event Overshoot " in FIG. 7) in such a way that this temporary overshoot so to speak becomes a countable overshoot. Similarly, the operating state determination function determines, with the aid of the ending minimum period t2 in which no new overshoot of the ending threshold L2 may occur, that a temporary overshoot so to speak becomes a countable undershoot of the ending threshold value L2. The overshoot result is thus only ended when the signal remains below the ending threshold value L2 for longer than the ending minimum period t2. FIG. 8 shows a schematic view of the signal processing of an operating state determination function which is designed with a triggering threshold value L1 and an ending threshold value L2 which are different from one another. FIG. 9 is a further schematic view of this mode of operation with a sensor signal which is different from the sensor signal shown in FIG. 8.

Figure 10:
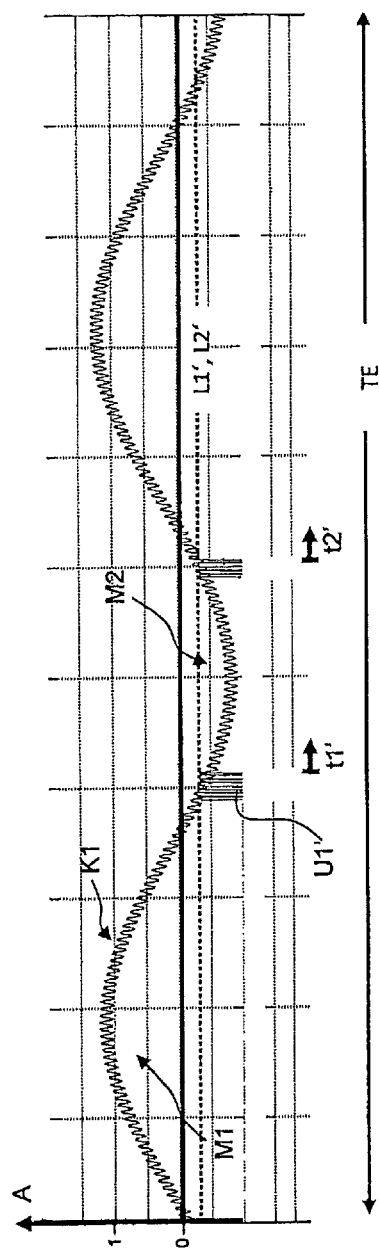
FIG. 10 is a schematic view of a sensor signal generated by the sensor device owing to the actuation of the adjustment component in a detection time period according to the invention, in which the undershoot of a threshold value by the sensor signal occurs, wherein the threshold value is simultaneously a triggering value and an ending value for determining the overshoot of at least one threshold value by the sensor signal.

FIG. 10 shows the signal processing for the detection of an undershoot of a threshold value by a local minimum M2 of the sensor signal. Similarly to the functionality shown with reference to FIG. 7, the triggering threshold value L1 and the ending threshold value L2' are identical. If the triggering minimum period t1' is undershot, a plurality of events in a transition region U1' owing to the high frequency oscillation fraction in the sensor signal occur, in which the sensor signal undershoots the triggering threshold value L1' and then increases back above the triggering threshold value L1' relatively shortly after until an undershoot of the triggering threshold value L1' takes place over a triggering minimum period t1, which is defined as a condition of a countable undershoot of the triggering threshold value L1'. Similarly, the operating state determination function determines, with the aid of the ending minimum period t2', in which no new undershoot of the ending threshold value L2' may occur, that a temporary overshoot so to speak becomes a countable overshoot of the ending threshold value L2'.

In one step a historical compilation so to speak can be formed, in which all measured values, in particular averaged, are arranged in succession. From this arrangement in succession of the, in particular averaged, values, a comparison can be made with a succession of values corresponding to a progress of wear and ageing over time and determined and provided in a calibration for operation. As described, the guidance system F can determine whether the oscillation behaviour of a adjustment component determined by the respective sensor device S corresponds to a predefined course of wear, which is normal in an intact adjustment component, and then has to be replaced from a predefined level of wear and/or has to be subjected to a maintenance measure and/or can no longer be used for the operation of the guidance system.

A signal processing device of the sensor device S can determine overshoots of a threshold value by frequency analysis. The frequency analysis can be started at the beginning of an operating phase, for example as soon as the adjustment component or the rotary actuator 300 is operated, that is to say the planetary gear rotates.

Figure 11:
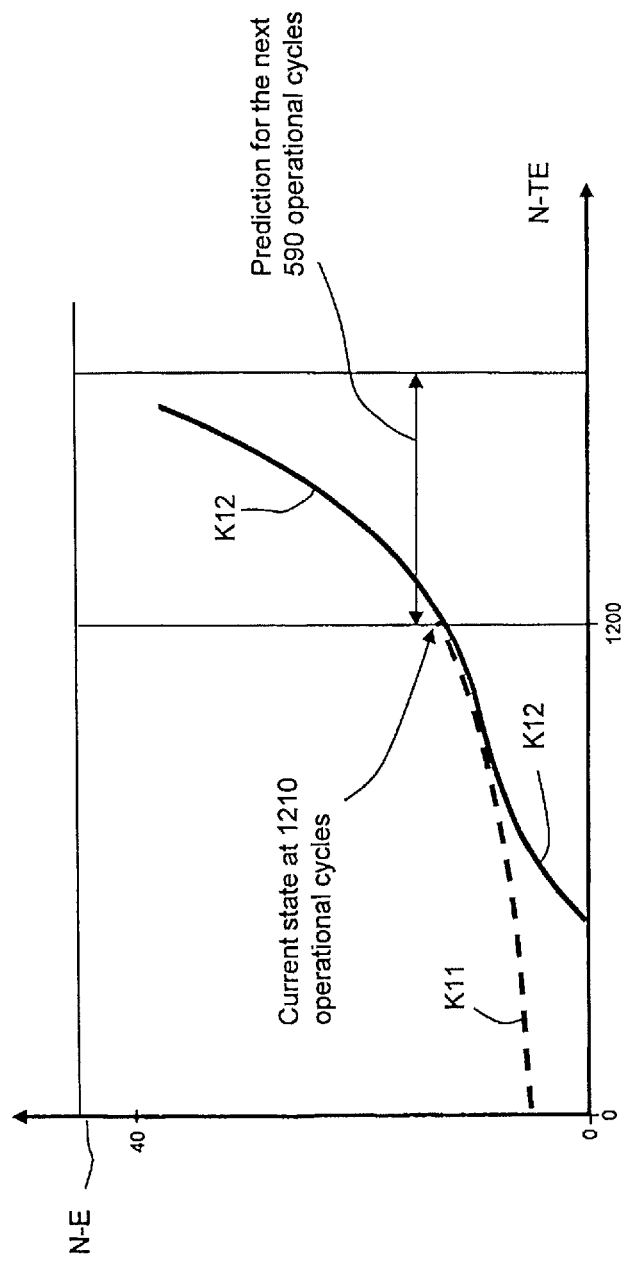
FIG. 11 shows a summation of overshoots and/or undershoots of respective threshold values within a respective detection time period according to the invention over the number of detection time periods.

FIG. 11 shows a further embodiment of the guidance system F according to the invention and the integrity determination function, with which an assessment of the time curve of the number of overshoots and/or undershoots at least one respective threshold value is used to assess the operating state and in particular maintenance state of a adjustment component. The function illustrated in FIG. 11 shows the curve, at a current moment in time of a detection period, of a sum of events obtained at this respective moment of overshoots and/or undershoots of at least one respective threshold value. The number of detection time periods N-TE at a current moment in time is plotted on the abscissa. The total overshoots and/or undershoots of at least one respective threshold value determined in total at a current moment in time is plotted on the ordinate. The curve K11 is the curve of the overshoots and/or undershoots actually determined of at least one respective threshold value. The curve K12 is the curve of overshoots and/or undershoots of at least one respective threshold value predicted on the basis of described calibrations. At a predefined absolute threshold value G-abs, the respective adjustment component in question must necessarily be subjected to a measure, such as a replacement or a maintenance measure. The integrity determination function may be designed in particular in such a way that, if the sum of the overshoots and/or overshoots at a current moment in time deviates from a number of overshoots and/or undershoots predicted for this moment in time over a predefined minimum period, the operating state is assessed in such a way that a maintenance measure and/or a replacement of the component must be carried out. In particular, a plurality of detection time portions may each be considered, that is to say a sum of ten successive detection time periods at a current moment in time, in order to compensate for random deviations over periods of time considered to be relatively brief. The operating system F may be designed in such a way that this assessment or situation may be requested by a corresponding maintenance device and the user interface 409.

In particular, the function-monitored guidance system F may be designed in such a way that, when determining the number of overshoots or undershoots in each of a plurality of detection time periods, the predicted total number of overshoots for allocation of an operating state increases overall or increases progressively in the sequence of detection periods from one detection period to the respective subsequent detection time period.

The invention claimed is:

1. A function-monitored guidance system comprising:
a mechanical adjustment component attached to a system component, wherein the adjustment component is operable to adjust or move portions of the system component;
a sensor device attached to the system component, wherein the sensor device is configured to detect a load state of the adjustment component during movement thereof; and
a monitoring device connected to the sensor device via a communication line, wherein the monitoring device comprises a processor and an operating state determination function executed by the processor for determining an operating state and in particular a maintenance state of the adjustment component;
wherein the operating state determination function:
provides at least one predefined or determined detection time period for capturing sensor signals detected by the sensor device;
provides at least one predefined or determined threshold value based on amplitudes of sensor signals; and
determines a number of overshoots of at least one threshold value by a captured sensor signal or a number of undershoots of at least one further threshold value by the captured sensor signal, in each case within the at least one detection time period, and from this determines a value for the operating state of the adjustment component; and
comprises a start function for initiating the determination of the operating state, which provides a predefined start level and a comparison of captured sensor signal values with the start level and is designed in such a way that onset of determination of the operating state is initiated when the start function determines that the captured sensor signal values are above the start level above a predefined initiation time period.

2. The function-monitored guidance system according to claim 1, wherein the operating state determination function records the number of overshoots of the at least one threshold value, in each case for an absolute amount of the sensor signal by taking into account a positive amount for the at least one threshold value.

3. The function-monitored guidance system according to claim 1, wherein the operating state determination function for processing sensor signals captured with reference to an adjustment component is designed in such a way that the operating state determination function allocates to the adjustment component, in case of an overshoot of a first minimum number of overshoots of the predefined threshold value by the sensor signal or, respectively, an absolute value of the sensor signal within the detection time period, an operating state value and, in particular, a maintenance state, and, in case of a second minimum number of overshoots of the predefined threshold value, the operating state determination function allocates to the adjustment component a further operating state value and, in particular, a further maintenance state.

4. The function-monitored guidance system according to claim 1, wherein the operating state determination function for processing sensor signals captured in relation to an adjustment component is designed in such a way that the operating state determination function allocates to the adjustment component, in case of an overshoot of a first minimum number of overshoots of a first predefined threshold value within the detection time period, an operating state value and, in particular, a maintenance state, or, in case of a second minimum number of overshoots or of a further predefined threshold value, an operating state value and, in particular, a further maintenance state.

5. The function-monitored guidance system according to claim 1, wherein the operating state determination function for detecting an overshoot or undershoot of at least one threshold value by the captured sensor signal provides at least a pair of threshold values, of which a first threshold value is defined as a triggering threshold value, and a second threshold value is defined as an ending threshold value, and the operating state determination function is designed in such a way:
that, in order to determine a number of threshold value overshoots by a respective captured sensor signal, a threshold value overshoot is considered to be provided under a condition that the operating state determination function determines an overshoot of a triggering threshold value and a subsequent fall of the sensor signal below the ending threshold value; and
that, in order to determine a number of threshold value undershoots by a respective captured sensor signal, a threshold value undershoot is considered to be provided under a condition that the operating state determination function determines a fall of the sensor signal below a triggering threshold value and a subsequent overshoot of the ending threshold value.

6. The function-monitored guidance system according to claim 5, wherein the operating state determination function is designed in such a way that the operating state determination function determines an overshoot of the triggering threshold value by the captured sensor signal or a fall of the captured sensor signal below the triggering threshold value, in each case by a triggering minimum period.

7. The function-monitored guidance system according to claim 5, wherein the operating state determination function determines a fall of the captured sensor signal below the ending threshold value or an overshoot of the ending threshold value by the captured sensor signal, in each case by an ending minimum period.

8. The function-monitored guidance system according to claim 5, wherein the triggering threshold value and the ending threshold value are equal in terms of value.

9. The function-monitored guidance system according to claim 6, wherein the operating state determination function determines a fall of the captured sensor signal below the ending threshold value or an overshoot of the ending threshold value by the captured sensor signal, in each case by an ending minimum period, and wherein the triggering minimum period or the ending minimum period are equal.

10. The function-monitored guidance system according to claim 1, wherein the detection time periods are defined by at least one operating phase of the adjustment component or of the guidance system, the detection time periods in which the monitoring device detects the number of overshoots or undershoots of a predefined threshold value being provided in a predefined manner, in particular within a predefined operating phase of the adjustment component or of the guidance system, or coinciding temporally with the operating phase.

11. The function-monitored guidance system according to claim 1, wherein the detection time periods are defined by an actuation of the adjustment component or of the guidance system, a detection time period in which the monitoring device detects the number of overshoots of a predefined threshold value being activated, in particular upon each actuation or upon selected actuations of the adjustment component or of the guidance system.

12. The function-monitored guidance system according to claim 1, wherein the operating state determination function is designed in such a way that an operating state assessment of the adjustment component is carried out if there is a deviation of a sum of overshoots or undershoots at a current moment in time from a number, predicted for the current moment in time, of overshoots or undershoots over a predefined minimum period.

13. The function-monitored guidance system according to claim 1, wherein the sensor device comprises a sensor which is attached to a housing of the adjustment component, in particular to an inner face or outer face of the housing of the adjustment component.

14. The function-monitored guidance system according to claim 13, wherein the sensor of the sensor device for determining a load state of the adjustment component comprises one or more of the following sensors: at least one oscillation sensor for detecting structural oscillations, at least one acceleration sensor, at least one torque sensor, at least one vibration sensor, at least one strain gauge, an arrangement of strain gauges, at least one piezo vibration sensor, at least one microphone, or at least one measuring device having a contactless laser, with which vibrational movements and resultant load states of the adjustment component are determined over a respective current period between a moving part of the adjustment component and a reference point.

15. The function-monitored guidance system according to claim 1, wherein the operating state determination function has a stop function for ending the determination of the operating state, which provides a predefined stop level lying below the start level and a comparison of captured sensor signal values with the stop level and is designed in such a way that the determination of the operating state is stopped when the stop function determines that the signal values are below the stop level over a predefined initiation time period.

16. The function-monitored guidance system according to claim 1, wherein the operating state determination function formed of a plurality of detection time periods produces a series of indices, from a time curve of the adjustment component of which a value for the operating state is derived, in particular the operating state of each of the plurality of detection time periods being determined in each case by the start function.

17. The function-monitored guidance system according to claim 16, wherein the operating state determination function allocates a value for the operating state from a time curve of the indices.

18. The function-monitored guidance system according to claim 1, wherein the guidance system is a vehicle system, in particular of a land vehicle, a watercraft, or an aircraft.

19. The function-monitored guidance system according to claim 1, wherein the guidance system is an adjustment system of an aircraft, in particular for actuating adjustable flaps, and in that the adjustment component is a gear unit, a rotary actuator, a bearing device of an adjustment system, in particular of a high-lift system of an aircraft.

20. The function-monitored guidance system according to claim 19, wherein the guidance system is a guidance system of an aircraft for adjusting adjustable flaps thereof, and in that the at least one adjustment component is an actuator, a gear unit, a hydraulic drive, a transmission shaft, or a bearing.

21. The function-monitored guidance system according to claim 1, wherein the guidance system is a flap guidance system of a high-lift system of an aircraft for adjusting high-lift flaps thereof.

22. The function-monitored guidance system according to claim 21, wherein the detection time period in each case comprises a complete operating cycle of the high-lift system, more specifically the time period of the movement of the high-lift flaps starting from a starting position into the take-off position, from the take-off position into the cruising flight position, and from the cruising flight position into at least one landing position.

23. The function-monitored guidance system according to claim 1, wherein the guidance system is an adjustment system or a bearing system of a wind turbine.

24. A method for monitoring the function of at least one adjustment component, the method comprising:
  providing a mechanical adjustment component and attaching the adjustment component to a system component, wherein the adjustment component is operable to adjust or move one or more portions of the system component;
  attaching a sensor device to the system component, wherein the sensor device is configured to detect a load state of the adjustment component during movement thereof;
  providing a monitoring device comprising a processor and an operating state determination function executed by the processor;
  connecting, via a communication line, the monitoring device to the sensor device;
  capturing sensor signals communicated from the sensor device during at least one predefined or determined detection time period;
  providing at least one predefined or determined threshold value based on amplitudes of the sensor signals;
  determining from a number of overshoots of at least one threshold value by a captured sensor signal or a number of undershoots of at least one further threshold value by the captured sensor signal, in each case within the at least one detection time period, of a value for an operating state of the adjustment component; and
  initiating a start function to determine a functional operating state which provides a predefined start level and a comparison of captured sensor signal values with the start level and is designed such that onset of determination of the operating state is initiated when the start function determines that the signal values are above the start level above a predefined initiation time period.

* * * * *